United States Patent
Hirohashi et al.

(10) Patent No.: US 6,287,523 B1
(45) Date of Patent: Sep. 11, 2001

(54) METAL THIN FILM FOR METAL CATALYST CARRIER AND METAL CATALYST CONVERTER EMPLOYING THE METAL THIN FILM

(75) Inventors: Junichiroh Hirohashi; Masamitsu Takahashi; Tadashi Nagai; Masakazu Noda; Hiroshi Tanabe; Yasuhiro Mita; Humihiko Katoh, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/125,149

(22) PCT Filed: Dec. 26, 1997

(86) PCT No.: PCT/JP97/04875

§ 371 Date: Aug. 11, 1998

§ 102(e) Date: Aug. 11, 1998

(87) PCT Pub. No.: WO99/08789

PCT Pub. Date: Feb. 25, 1999

(30) Foreign Application Priority Data

Aug. 20, 1997 (JP) .................................................. P9-223785

(51) Int. Cl.[7] .............................. B01J 35/04; B01D 53/88; F01N 3/28

(52) U.S. Cl. ........................ 422/180; 422/177; 422/222; 428/116; 428/593; 428/597; 502/439; 502/527.21; 502/527.22

(58) Field of Search .................................... 422/180, 177, 422/211, 222; 502/439, 527.21, 527.22; 428/116, 593, 597

(56) References Cited

U.S. PATENT DOCUMENTS

| | | | |
|---|---|---|---|
| 4,665,051 | * 5/1987 | Nonnenmann | 502/439 |
| 5,045,403 | * 9/1991 | Maus et al. | 428/593 |
| 5,177,960 | * 1/1993 | Hitachi et al. | 60/299 |
| 5,384,100 | * 1/1995 | Freund | 422/180 |

FOREIGN PATENT DOCUMENTS

| | | |
|---|---|---|
| 3844350A1 | 12/1988 | (DE) . |
| 3844350 | * 7/1990 | (DE) . |
| 0375986A1 | 12/1988 | (EP) . |
| 0887521A1 | 12/1998 | (EP) . |

OTHER PUBLICATIONS

Patent Abstracts Of Japan, Unexamined Applications, Section: C, Sect. No. 749, vol. 14, No. 382, p. 15; Manufacture Of Metal Catalyst Carrier (JP 2–139045, A; May 29, 1990).
WPINDEX, 1998, Derwent Information Ltd.; Reactor Catalyst Matrix Appts. For Car Exhaust Emissions–Comprises Corrugated Steel Sheet Strips Coated With Layers Of Catalyst And Cut To Form Channels (JP 6–55258, B2; Jul. 27, 1994).
JP, 57–8915, Y2; Feb. 20, 1982.

* cited by examiner

*Primary Examiner*—Hien Tran
(74) *Attorney, Agent, or Firm*—Nath & Associates PLLC; Gary M. Nath; Marvin C. Berkowitz

(57) ABSTRACT

In the corrugated metal sheet 5 in which the crest portions 5*a* and the trough portions 5*b* are formed in plural alternatively along the corrugation direction 61, the rack portions 5*f*, the rising trough portions 5*d*, and the rising crest portions 5*e* are provided in plural. The rack portions 5*f* are arranged between the crest portions 5*a* and the trough portions 5*b* and extended along the folding direction 60 and the corrugation direction 61 to couple adjacent crest portions 5*a* and trough portions 5*b*. The rising trough portions 5*d* are folded from the boundaries between the crest portions and the rack portions 5*f* such that part of the crest portions 5*a* being divided by two cuttings separated in the folding direction 60 are protruded partially in the same direction as the trough portions 5*b*. The rising crest portions 5*e* are folded from the boundaries between the trough portions and the rack portions 5*f* such that part of the trough portions 5*a* being divided by two cuttings separated in the folding direction 60 are protruded partially in the same direction as the crest portions 5*b*.

18 Claims, 16 Drawing Sheets

METAL THIN FILM FOR METAL CATALYST CARRIER AND METAL CATALYST CONVERTER EMPLOYING THE METAL THIN FILM

TECHNICAL FIELD

The present invention relates to a metal sheet for metallic catalyst carrier and a metallic catalyst converter using the same.

BACKGROUND ART

In an exhaust system of a vehicle such as automobile, etc., a catalyst converter for purifying an exhaust gas being exhausted from an engine is incorporated. As the catalyst carrier used in the catalyst converter, as shown in FIG. 18, a metallic catalyst carrier 23 having a honeycomb structure, in which a corrugated sheet 21 formed by applying corrugation process to a strip-like metal sheet base and a flat sheet 22 are superposed and then they are wound several times, has been widely employed (see Patent Application Publication (KOKOKU) Hei 8-11195).

Upon manufacturing the metallic catalyst carrier 23, a film-out phenomenon must be prevented by eliminating relative movement between the corrugated sheet 21 and the flat sheet 22. As a method of preventing such film-out phenomenon, methods have been adopted such that connected areas between the corrugated sheet 21 and the flat sheet 22 are jointed by welding or brazing, the metallic catalyst carrier 23 is fastened/pressurized by pressurizing jig such as a die and then is heated in a vacuum state to diffuse/joint the corrugated sheet 21 and the flat sheet 22 integrally, etc.

However, in the above metallic catalyst carrier 23, a weight becomes heavier by the presence of the flat sheet 22. In addition, since the corrugated sheet 21 can absorb thermal stress due to the high temperature exhaust gas but the flat sheet 22 is hard to absorb such thermal stress, stress strain occurs at the junction points between the corrugated sheet 21 and the flat sheet 22 to thus cause breaking and disconnection.

Therefore, in Patent Application Publication (KOKAI) Hei 5-138040, as shown in FIG. 19, the metal sheet 27 for metallic catalyst carrier has been disclosed wherein the corrugated sheet 24 is divided into a plurality of columns 25a, 25b, 25c, 25d along the winding direction, then a corrugate shape 26 is formed continuously in respective columns 25a, 25b, 25c, 25d at a predetermined pitch, and then phases of respective columns 25a, 25b, 25c, 25d are shifted between adjacent columns mutually and then wounded several times.

In the metallic catalyst carrier using such metal sheet 27, a weight of the metallic catalyst carrier can be made lighter as a whole because the flat sheet can be omitted. As a result, heat capacity of the metallic catalyst carrier can be made smaller so that a temperature rising time can be shortened, and the metallic catalyst carrier is excellent in absorption of thermal stress, and there is no possibility that breaking of the metal sheet 27 and disconnection of the metal sheet 27 due to such breaking are caused. In addition, since end portions of superposed the corrugate shape 26 of the metal sheet 27 are engaged with each other, relative movement of the metal sheet 27 can be prevented. Therefore, so-called film-out phenomenon in which superposed layers of the metal sheet 27 are displaced to thus project like bamboo sprout (like a spiral shape) never occurs.

DISCLOSURE OF INVENTION

However, in the above metal sheet 27, as shown in a front view in FIG. 20, respective columns 25a, 25b, 25c, 25d are coupled mutually only at intersection points P between crest portion 26a and trough portions 26b of the corrugate shape 26. Hence, if difference in coefficients of thermal expansion is caused because of temperature change in the columns 25a, 25b, 25c, 25d generated when the exhaust gas flows thereinto, it is possible that mutual coupling portions between respective columns 25a, 25b, 25c, 25d at the above intersection points P are broken off.

Therefore, it is a first object of the present invention to provide a metal sheet for metallic catalyst carrier which is capable of enhancing breaking endurance rigidity of a metal sheet per se formed in a corrugate shape, constructing a honeycomb carrier in which cells are formed in superposed portions by superposing only the corrugated metal sheets, and avoiding mutual fittings of the metal sheets even when adjacent superposed metal sheets are displaced in a corrugation direction or a fold direction of a corrugate shape.

Further, in the metallic catalyst converter of this type, as shown in FIG. 21, a honeycomb carrier 30 in which a number of cells are formed by superposing the above corrugated metal sheets 27 is formed, and then a core body is formed by providing this honeycomb carrier 30 onto a not shown outer cylinder.

As shown in FIG. 22, the honeycomb carrier 30 can be formed by folding/superposing sequentially the above corrugated metal sheets 27 along the corrugation direction to form S-shapes, or by superposing several sheets of the above metal sheets 27 each having a predetermined length.

However, since such superposed metal sheets 27 are not secured mutually, there is a possibility that a so-called aperture opening phenomenon occurs, i.e., the metal sheets 27 are extended by the pressure of the entering exhaust gas in the upstream side of the exhaust gas, as shown in FIG. 23 in the former case and as shown in FIG. 24 in the latter case.

Therefore, it is a second object of the present invention to provide a metallic catalyst converter capable of preventing the aperture opening phenomenon in use effectively.

In order to achieve the above objects, according to the first aspect, there is provided a metal sheet for metallic catalyst carrier comprising a plurality of first convex portions; a plurality of second convex portions; and a plurality of rack portions; wherein the first convex portions are folded to protrude to one surface side of the metal sheet and extended in a first direction, the second convex portions are folded to protrude to other surface side of the metal sheet and extended in the first direction, the first convex portions and the second convex portions are arranged alternatively in parallel along a second direction intersecting with the first direction to form a corrugate shape, the rack portions are arranged between the first convex portions and the second convex portions and extend along the first direction and connect adjacent first convex portions and second convex portions, the first convex portions have third convex portions which are divided by two cuttings separated in the first direction and are folded to protrude partially to the other surface side of the metal sheet, and the second convex portions have fourth convex portions which are divided by two cuttings separated in the first direction and are folded to protrude partially to the one surface side of the metal sheet.

According to the second aspect, in the metal sheet for metallic catalyst carrier of the first aspect, end portions of the cuttings for dividing the third convex portions are positioned on boundary portions between the first convex portions and the rack portions, the third convex portions are folded from the boundary portions between the first convex portions and the rack portions, end portions of the cuttings for dividing the fourth convex portions are positioned on boundary portions between the second convex portions and the rack portions, and the fourth convex portions are folded from the boundary portions between the second convex portions and the rack portions.

According to the third aspect, in the metal sheet for metallic catalyst carrier of the first aspect, the third convex portions and the fourth convex portions are provided respectively along the first direction in plural.

According to the fourth aspect, in the metal sheet for metallic catalyst carrier of the third aspect, the third convex portions and the fourth convex portions are arranged based on predetermined regularity. More particularly, lengths of the third convex portions along the first direction and distances between the adjacent third convex portions are set based on a predetermined regularity in the same first convex portions, while lengths of the fourth convex portions along the first direction and distances between the adjacent third convex portions are set based on a predetermined regularity in the same second convex portions.

According to the fifth aspect, in the metal sheet for metallic catalyst carrier of the fourth aspect, the first convex portions and the fourth convex portions provided in the second convex portions adjacent to the first convex portions are arranged such that at least a part thereof in the first direction protrude continuously toward one surface side of the metal sheet along the second direction.

According to the sixth aspect, in the metal sheet for metallic catalyst carrier of the fourth aspect, the second convex portions and the third convex portions provided in the first convex portions adjacent to the second convex portions are arranged such that at least a part thereof in the first direction protrude continuously toward other surface side of the metal sheet along the second direction.

According to the seventh aspect, in the metal sheet for metallic catalyst carrier of the fifth aspect or the sixth aspect, the third convex portions provided in the first convex portions and the fourth convex portions provided in the second convex portions adjacent to the first convex portions are arranged such that at least parts thereof in the first direction continue along the second direction.

According to the eighth aspect, in the metal sheet for metallic catalyst carrier of the third aspect, the first convex portions and the fourth convex portions provided in the second convex portions adjacent to the first convex portions are arranged such that at least a part thereof in the first direction protrude continuously toward one surface side of the metal sheet along the second direction, and the second convex portions and the third convex portions provided in the first convex portions adjacent to the second convex portions are arranged such that at least a part thereof in the first direction protrude continuously toward other surface side of the metal sheet along the second direction.

According to the ninth aspect, in the metal sheet for metallic catalyst carrier of the eighth aspect, at least one of lengths of the third convex portions provided in the same first convex portions along the first direction is different from the other lengths thereof, at least one of lengths of clearances formed between the third convex portions provided in the same first convex portions along the first direction is different from the other lengths thereof, at least one of lengths of the fourth convex portions provided in the same second convex portions along the first direction is different from the other lengths thereof, and at least one of lengths of clearances formed between the fourth convex portions provided in the same second convex portions along the first direction is different from other lengths thereof.

According to the tenth aspect, in the metal sheet for metallic catalyst carrier of the eighth aspect or the ninth aspect, both contiguous number of the first convex portions and the fourth convex portions to protrude to one surface side of the metal sheet and contiguous number of the second convex portions and the third convex portions to protrude to other surface side of the metal sheet are less than two.

In order to achieve the above objects, according to the eleventh aspect, there is provided a metal sheet for metallic catalyst carrier comprising a plurality of first convex portions; and a plurality of second convex portions; wherein the first convex portions are folded to protrude to one surface side of the metal sheet and extended in a first direction, the second convex portions are folded to protrude to other surface side of the metal sheet and extended in the first direction, the first convex portions and the second convex portions are arranged alternatively along a second direction intersecting with the first direction to form a corrugate shape, the first convex portions have third convex portions which are divided by two cuttings separated along the first direction and are folded to protrude partially to the other surface side of the metal sheet, the second convex portions have fourth convex portions which are divided by two cuttings separated along the first direction and are folded to protrude partially to the one surface side of the metal sheet, the third convex portions and the fourth convex portions are provided in plural along the first direction respectively, and at least ones of the third convex portions and the fourth convex portions are arranged based on predetermined regularity along a third direction intersecting with both the first direction and the second direction.

In order to achieve the above objects, according to the twelfth aspect, there is provided a metal sheet for metallic catalyst carrier comprising a plurality of first convex portions; and a plurality of second convex portions; wherein the first convex portions are folded to protrude to one surface side of the metal sheet and extended in a first direction, the second convex portions are folded to protrude to other surface side of the metal sheet and extended in the first direction, the first convex portions and the second convex portions are arranged alternatively along a second direction intersecting with the first direction to form a corrugate shape, the first convex portions have third convex portions which are divided by two cuttings separated along the first direction and are folded to protrude partially to the other surface side of the metal sheet, the second convex portions have fourth convex portions which are divided by two cuttings separated along the first direction and are folded to protrude partially to the one surface side of the metal sheet, the third convex portions and the fourth convex portions are provided in plural along the first direction respectively, and predetermined intervals are provided between end portions of the cuttings for dividing the third convex portions and end portions of the cuttings for dividing the fourth convex portions along the first direction.

In order to achieve the above objects, according to the thirteenth aspect, there is provided a honeycomb carrier using a metal sheet of any of the first aspect to the twelfth aspect formed by folding the metal sheet like S-shape continuously in the second direction to be superposed like a honeycomb, otherwise cutting the metal sheet at a predetermined length, and then superposing like the honeycomb plural sheets of the metal sheet being cut.

In order to achieve the above objects, according to the fourteenth aspect, there is provided a metallic catalyst converter using a honeycomb carrier of the thirteenth aspect, comprising a metallic catalyst carrier using the honeycomb carrier as a base; a metal outer cylinder into which the metallic catalyst carrier is incorporated; and a holding member for holding the metallic catalyst carrier.

According to the fifteenth aspect, in the metallic catalyst converter of the fourteenth aspect, metallic catalyst carriers are arranged in plural adjacently in the outer cylinder in a front and rear direction, and end surfaces of metallic catalyst carriers placed adjacently in the front and rear direction contact with each other such that superposed directions of metal sheets constituting the metallic catalyst carrier are changed by substantially 90° in phase.

According to the sixteenth aspect, the metallic catalyst converter of the fourteenth aspect further comprising regulating catalyst carriers positioned at least adjacent to side end portion of the metallic catalyst carrier facing to an exhaust inlet side of the outer cylinder, and for regulating an incoming exhaust gas.

The metal sheet of the first aspect to the tenth aspect comprises the rack portions which are arranged between the first convex portions and the second convex portions and extend along the first direction, and connect adjacent first convex portions and second convex portions, third convex portions which are provided in the first convex portions and divided by two cuttings separated in the first direction, and folded to protrude partially to other surface side of the metal sheet, and fourth convex portions which are provided in the second convex portions, and divided by two cuttings separated in the first direction, and folded to protrude partially to one surface side of the metal sheet. When the honeycomb carrier in which a number of cells are formed by superposing the metal sheets is constructed, mutual fitting and sticking of the metal sheets can be avoided because of the presence of the third convex portions and the fourth convex portions even if the metal sheets are displaced mutually along the folding direction of the corrugate shape. In addition, even if the metal sheets are shifted in the corrugation direction, mutual fitting and sticking of the metal sheets can be avoided since the first concave portion or the second concave portion, or the third concave portion or the fourth concave portion hits on the rack portions, and the cells can be assured as a whole and thus exhaust gas purifying performance can be maintained.

In particular, in the metal sheet of the second aspect, end portions of the cuttings for dividing the third convex portions are positioned on boundary portions between the first convex portions and the rack portions, and end portions of the cuttings for dividing the fourth convex portions are positioned on boundary portions between the second convex portions and the rack portions. Therefore, end portions of the cuttings for dividing the third convex portions and the fourth convex portions are separated without fail by the width of the rack portions. Hence, breaking between the end portions of the cuttings due to difference in coefficients of thermal expansion can be avoided.

In the metal sheet of the fourth aspect, the third convex portions and the fourth convex portions are arranged based on predetermined regularity. Therefore, if the honeycomb carrier which has a number of cells formed by superposing the metal sheets is formed, mutual fitting and sticking of the metal sheets due to displacement along the first direction or the second direction can be surely avoided.

In the metal sheet of the fifth aspect or the sixth aspect, the first convex portions and the fourth convex portions provided in the second convex portions adjacent to the first convex portions are arranged such that at least part thereof in the first direction protrude continuously toward one surface side of the metal sheet along the second direction. Therefore, if the honeycomb carrier which has a number of cells formed by superposing the metal sheets is formed, mutual fitting and sticking of the metal sheets due to displacement along the first direction or the second direction can be surely avoided.

In the metal sheet of the seventh aspect, the third convex portions provided in the first convex portions and the fourth convex portions provided in the second convex portions adjacent to the first convex portions are arranged such that at least part thereof in the first direction continue along the second direction. That is, parts in which plural third convex portions and plural fourth convex portions are formed sequentially along the second direction can be firmly formed.

In the metal sheet of the eighth aspect, the first convex portions and the fourth convex portions provided in the second convex portions adjacent to the first convex portions are arranged such that at least a part thereof in the first direction protrude continuously toward one surface side of the metal sheet along the second direction, and the second convex portions and the third convex portions provided in the first convex portions adjacent to the second convex portions are arranged such that at least a part thereof in the first direction protrude continuously toward other surface side of the metal sheet along the second direction. Therefore, if the honeycomb carrier which has a number of cells formed by superposing the metal sheets is formed, portions even if the metal sheets are displaced mutually along the folding direction of the corrugate shape and the corrugation direction. In addition, the cells can be assured as a whole and thus exhaust gas purifying performance can be maintained.

Furthermore, at least ones of the third convex portions and the fourth convex portions are arranged based on predetermined regularity along a third direction which intersects with both the first direction and the second direction. Therefore, end portions of the cuttings for dividing the third convex portions and the fourth convex portions are separated without fail by the width of the rack portions. Hence, breaking between the end portions of the cuttings due to difference in coefficients of thermal expansion can be avoided.

The metal sheet of the twelfth aspect comprises plurality third convex portions which are provided in the first convex portions, and divided by two cuttings separated along the first direction, and folded to protrude partially to other surface side of the metal sheet, and fourth convex portions which are provided in the second convex portions, and divided by two cuttings separated along the first direction, and folded to protrude partially to one surface side of the metal sheet. Therefore, if the honeycomb carrier in which a number of cells are formed by superposing the metal sheets is constructed, mutual fitting and sticking of the metal sheets can be avoided because of the presence of the third convex portions and the fourth convex portions even if the metal sheets are displaced mutually along the folding direction of the corrugate shape and the corrugation direction. In addition, the cells can be assured as a whole and thus exhaust gas purifying performance can be maintained.

In addition, predetermined intervals are provided between end portions of two cuttings for dividing the third convex portions and end portions of two cuttings for dividing the fourth convex portions along the first direction. Therefore, breaking between the end portions of the cuttings due to difference in coefficients of thermal expansion can be avoided.

In the metallic catalyst converter of the fourteenth aspect to the sixteenth aspect using the honeycomb carrier of the thirteenth aspect, the metallic catalyst carrier which is incorporated into the metal outer cylinder is held by the holding member. Therefore, the film-out phenomenon caused due to a total displacement of the metal catalyst carrier to the outer cylinder or mutual displacement of superposed metal sheets can be prevented.

Especially, in the metallic catalyst converter of the fifteenth aspect, metallic catalyst carriers are arranged in plural adjacently in the outer cylinder in the front and rear direction, and end surfaces of metallic catalyst carriers placed adjacently in the front and rear direction contact with each other such that superposed directions of metal sheets constituting the metallic catalyst carrier are changed by substantially 90° in phase. Therefore, rigidity of the metal sheets can be increased because respective widths of the metallic catalyst carriers in the backward/forward direction can be shortened and also opening of the superposed metal sheets of the metallic catalyst carriers because of the input exhaust gas pressure can be suppressed since edge portions of the metal sheets of the metallic catalyst carriers are welded with pressure orthogonal at contacting portions of the metallic catalyst carriers which are adjacent back and forth, so that the aperture opening phenomenon of the metallic catalyst carriers can be prevented.

The metallic catalyst converter of the sixteenth aspect further comprises regulating catalyst carriers positioned at least adjacent to side end portion of the metallic catalyst carrier facing to an exhaust inlet side of the outer cylinder, and for regulating an incoming exhaust gas. Therefore, the exhaust gas which flows into the outer cylinder can be scattered substantially uniformly in the radial direction and thus concentration of the exhaust gas to the center portion of the outer cylinder can be avoided. Therefore, opening of the superposed metal sheets in the metal catalyst carrier can be suppressed and thus the aperture opening phenomenon can be prevented. Hence, the exhaust gas purifying performance can be improved still further.

BEST MODE FOR CARRYING OUT THE INVENTION

Embodiments of the present invention will be explained in detail with reference to the accompanying drawings hereinafter.

For convenience, concave-shaped polygonal lines are depicted by broken lines in the plan view of the metal sheet.

Figure 14:
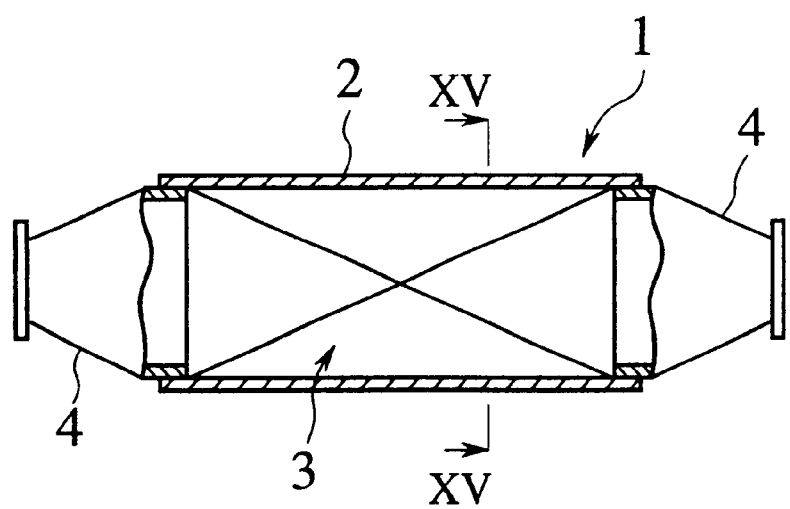
FIG. 14 is a schematic sectional view showing a first embodiment of a metallic catalyst converter of the present invention.
Figure 15:
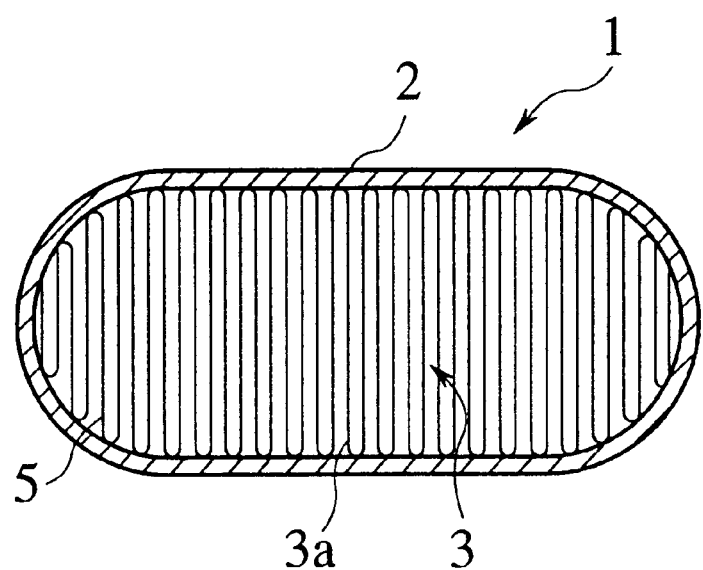
FIG. 15 is a sectional view showing the metallic catalyst converter taken along a XV—XV line in FIG. 14.

FIGS. 14 and 15 show a metallic catalyst converter 1, which comprises a metal outer cylinder 2 formed to have an elliptic sectional shape (including an ellipse), and a honeycomb metalllic catalyst carrier 3 provided in the outer cylinder 2.

Diffusers 4 on both end surfaces of the outer cylinder 2 are formed separatedly. The diffusers 4, 4 are fitted into both ends of the outer cylinder 2 to be fixed, and a metallic catalyst carrier 3 is held by peripheral end surfaces of the diffusers. Accordingly, the diffusers 4 acts as holding members for the metallic catalyst carrier 3. Peripheral end surfaces may be formed like flanges so as to enlarge a holding area.

The metallic catalyst carrier 3 can be formed by coating a binder made of alumna called "wash coat" on a honeycomb carrier as a base, and then distributing the catalyst such as Pt, etc. on a resultant surface. Then, the honeycomb carrier 3a can be formed to create cells at respective superposed portions by folding sequentially corrugated metal sheets 5 made of stainless steel, etc. (for example, Fe—Cr—Al alloy) like S-shape along the corrugation direction (second direction) 61 (see FIG. 1) to be superposed.

This honeycomb carrier 3a may be formed by laminating plural sheets of the metal sheets 5 which are cut to have a predetermined length or may be formed by winding the metal sheets 5 to be laminated.

Figure 1:
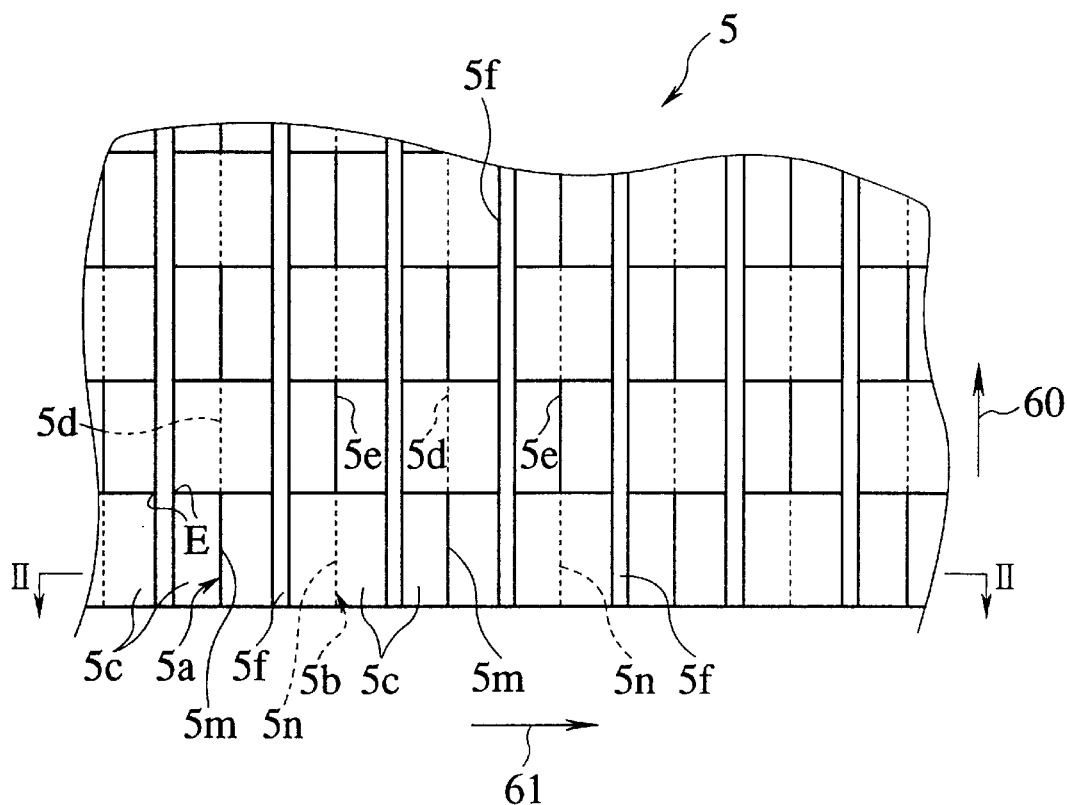
FIG. 1 is a plan view showing a first embodiment of a metal sheet of the present invention.
Figure 2:
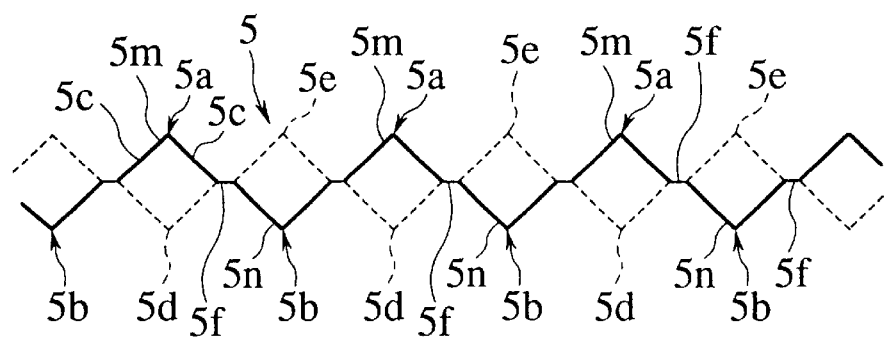
FIG. 2 is a sectional view showing the metal sheet taken along a II—II line in FIG. 1.

FIG. 1 is a plan view of a standard pattern of a first embodiment of a metal sheet of the present invention, and FIG. 2 shows a sectional shape taken along a II—II line in FIG. 1.

This metal sheet 5 has a plurality of crest portions (first convex portions) 5a and a plurality of trough portions (second convex portions) 5b as standards, as shown in FIG. 2. The crest portions 5a are folded to protrude toward one surface side of the metal sheet 5, and the trough portions 5b are folded to protrude toward the other surface side of the metal sheet 5. The crest portions 5a and the trough portions 5b are arranged alternatively to form a corrugate shape. Rack portions 5f extending along the fold direction (first direction) 60 of the corrugate shape are formed in central areas of the slant walls 5c constituting the crest portions 5a and the trough portions 5b.

A plurality of rising trough portions (third convex portions) 5d are provided against the corrugated crest portions 5a along the folding direction 60 of the corrugate shape, while a plurality of rising crest portions (fourth convex portions) 5e are provided against the corrugated trough portions 5b along the fold direction 60 of the corrugate shape.

The rising trough portion 5d is formed such that a part of the crest portion 5a, which is divided by two cuttings which are separated along the folding direction 60 of the corrugate shape, is risen up so as to protrude toward the opposite direction (other surface side of the metal sheet 5) to the crest portion 5a. The rising crest portion 5e is formed such that a part of the trough portion 5b, which is divided by two cuttings which are separated along the folding direction 60 of the corrugate shape, is risen up so as to protrude toward the opposite direction (one surface side of the metal sheet 5) to the trough portion 5b. End portions E of the cuttings (rising stop ends) for partitioning the rising trough portion 5d are positioned at the boundary portions between the crest portion 5a and the rack portion 5f, and the rising trough portions 5d are folded from the boundary portions. End portions E of the cuttings (rising stop ends) for partitioning the rising crest portion 5e are positioned at the boundary portions between the trough portion 5b and the rack portion 5f, and the rising crest portions 5e are folded from the boundary portions.

Figure 3:
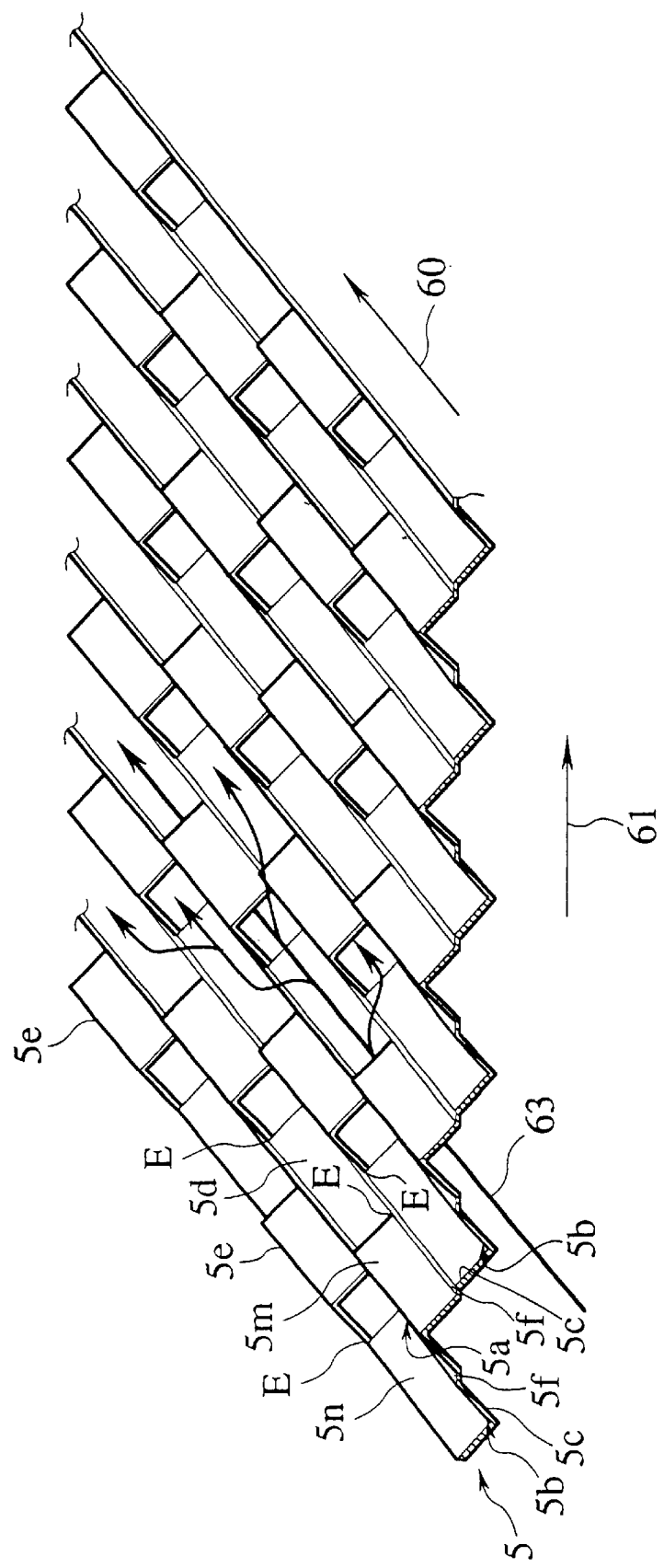
FIG. 3 is a perspective view showing the metal sheet in FIG. 1.

In this embodiment, portions (non-rising portions of the crest portion 5a) 5m of the corrugated crest portions 5a protruding to one surface side of the metal sheet 5, portions (non-rising portion of the trough portion 5b) 5n of the corrugated trough portions 5b protruding to the other surface side of the metal sheet 5, the rising trough portion 5d, and the rising crest portion 5e are set such that respective lengths along the folding direction 60 of the corrugate shape are substantially identical. The non-rising portions 5m of the crest portions 5a and the non-rising portions 5n of the trough portions 5b are arranged on a substantially straight line along the corrugation direction 61. Similarly, the rising trough portions 5d and the rising crest portions 5e are arranged on a substantially straight line along the corrugation direction 61. In other words, corrugation column of the non-rising portions 5m of the crest portions 5a and the non-rising portions 5n of the trough portions 5b along the corrugation direction 61 and corrugation column of the rising trough portions 5d and the rising crest portions 5e along the corrugation direction 61 are arranged based on such a regularity that they are positioned alternatively. This state is shown in FIG. 3 as a perspective view.

In a structure of this embodiment, the rack portions 5f are formed in central areas of slant walls 5c, which constitute the crest portions 5a and the trough portions 5b of the metal sheet 5, along the folding direction 60 of the corrugate shape as the boundaries, then the rising trough portions 5d are formed in plural along the folding direction 60 of the corrugate shape on the crest portion 5a of the corrugate shape, and then the rising crest portions 5e are formed in plural along the folding direction 60 of the corrugate shape on the trough portion 5b of the corrugate shape. Therefore, if the honeycomb carrier 3a which has a number of cells constructed by superposing the metal sheets 5 is formed by use of the rising trough portions 5d and the rising crest portions 5e, mutual fitting and sticking of the metal sheets 5, 5 can be avoided even if the metal sheets 5, 5 are displaced mutually in the folding direction 60 of the corrugate shape. In addition, since either the non-rising portions 5m of the crest portions 5a or the rising crest portions 5e, or the non-rising portions 5n of the trough portions 5b or the rising trough portions 5d abut to the rack portions 5f, mutual fitting and sticking of the metal sheets 5, 5 can be avoided even if the metal sheets 5, 5 are displaced mutually in the corrugation direction 61. Further, such abutting portions contribute to improve the rigidity of the honeycomb carrier 3a.

Accordingly, if the metallic catalyst converter 1 is constructed by forming the metallic catalyst carrier 3 using the honeycomb carrier 3a as a base as described above, then incorporating the carrier 3 into the outer cylinder 2, and then holding by the diffuser 4, the cells can be assured as a whole. Thus, as indicated by an arrow 63 in FIG. 3, flow of the exhaust gas can be achieved excellently to thus maintain the exhaust gas purifying performance.

The rising trough portions 5d and the rising crest portions 5e which are adjacent to each other on the metal sheet 5 along the corrugation direction 61 are formed while using the rack portions 5f, which are formed in the central area of the slant walls 5c constituting the crest portions 5a and the trough portions 5b of the corrugate shape of the metal sheet 5, as the boundaries. For this reason, distances equivalent to widths of the rack portions 5f can be assured along the corrugation direction 61 between respective rising stop ends E, E of the rising crest portions 5e and the rising trough portions 5d which are adjacent along the corrugation direction 61. Therefore, breaking between the rising stop ends E, E due to difference in coefficients of thermal expansion can be avoided.

As a result, breaking endurance rigidity of the metal sheet 5 itself can be enhanced and thus durability of the honeycomb carrier 3a, i.e., durability of the metallic catalyst carrier 3 can be improved.

Furthermore, mutual displacement of the metal sheets 5, 5 along the folding direction 60 of the corrugate shape can be prevented because of the presence of the rising crest portions 5e and the rising trough portions 5d and the metallic catalyst carrier 3 can be held by the peripheral surface of the diffuser 4, so that a film-out phenomenon of the metallic catalyst carrier 3 can be avoided.

In the explanation of the embodiment, it have been described that the metal sheet 5 has the crest portions 5a and the trough portions 5b of the corrugate shape as the standard and the rack portions 5f are formed along the folding direction 60 of the corrugate shape in the central areas of the slant walls 5c constituting the crest portions 5a and the trough portions 5b. In actual manufacturing, the rack portions 5f can be formed as unworked surfaces of the flat metal sheet used as material.

Figure 4:
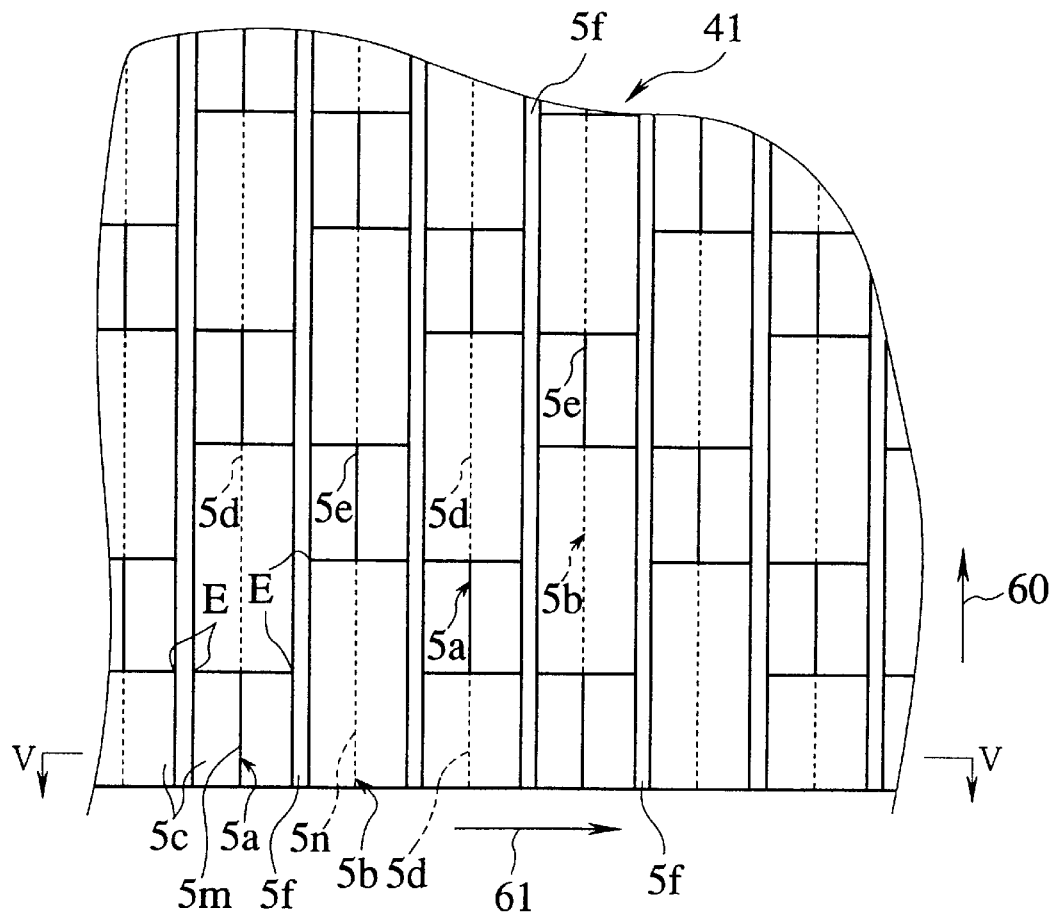
FIG. 4 is a plan view showing a second embodiment of the metal sheet of the present invention.
Figure 5:
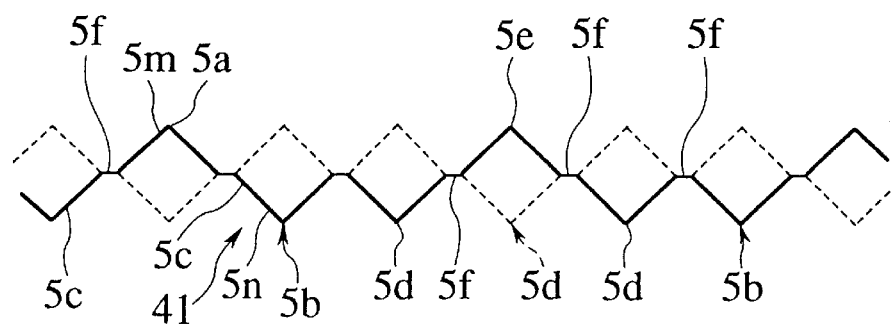
FIG. 5 is a sectional view showing the metal sheet taken along a V—V line in FIG. 4.

FIGS. 4 and 5 show a second embodiment of the metal sheet of the present invention. In this metal sheet 41 of this embodiment, the non-rising portions 5m of the crest portions 5a and the rising crest portions 5e are formed to have an identical length, and the non-rising portions 5n of the trough portions 5b or the rising trough portions 5d are formed to have an identical length which is twice the length of the non-rising portions 5m of the crest portions 5a or the rising crest portions 5e. One ends of the rising trough portions 5d and the rising crest portions 5e which are adjacent along the corrugation direction 61 are trued up to be positioned on a straight line along the corrugation direction 61. More particularly, the rising trough portions 5d and the rising crest portions 5e are arranged based on such a regularity that a part of the rising trough portions 5d and the rising crest portions 5e are aligned sequentially along the corrugation direction 61.

Of course, the rising trough portions 5d and the rising crest portions 5e may be arranged based on a regularity that at least part of them are aligned sequentially along the corrugation direction 61. In addition, the rising trough portions 5d and the rising crest portions 5e may be arranged based on such a regularity that at least part of the non-rising portions 5m of the crest portions 5a and the rising crest portions 5e are aligned sequentially along the corrugation direction 61.

Therefore, according to a structure of this embodiment, in addition to advantages of the first embodiment, since at least part of the trough portions 5b and the rising crest portions 5e are aligned sequentially along the corrugation direction 61, mutual fitting and sticking of the metal sheets 41, 41 due to displacement in the folding direction 60 of the corrugate shape or the corrugation direction 61 can be almost eliminated.

Figure 6:
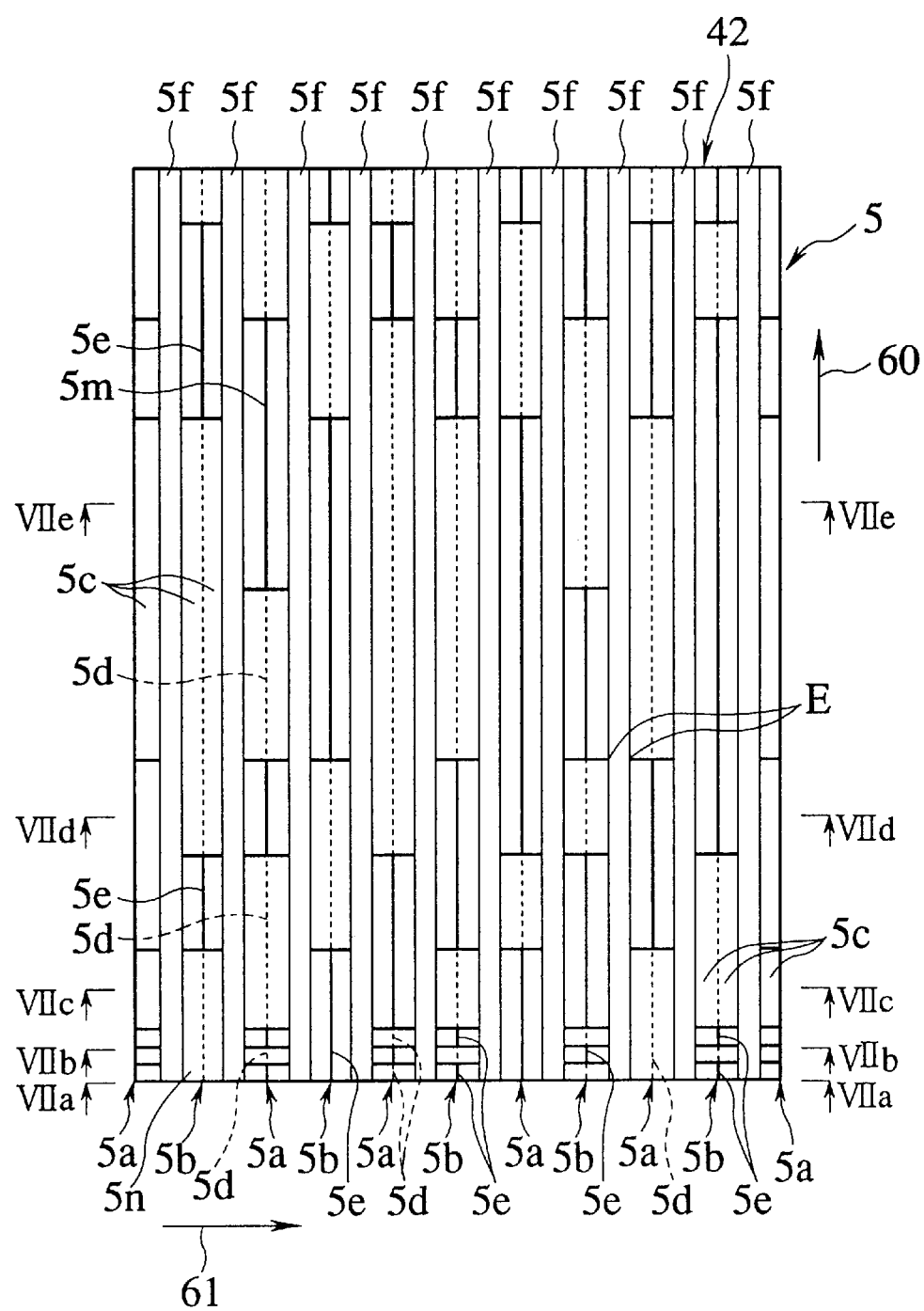
FIG. 6 is a plan view showing a third embodiment of the metal sheet of the present invention.
Figure 7:
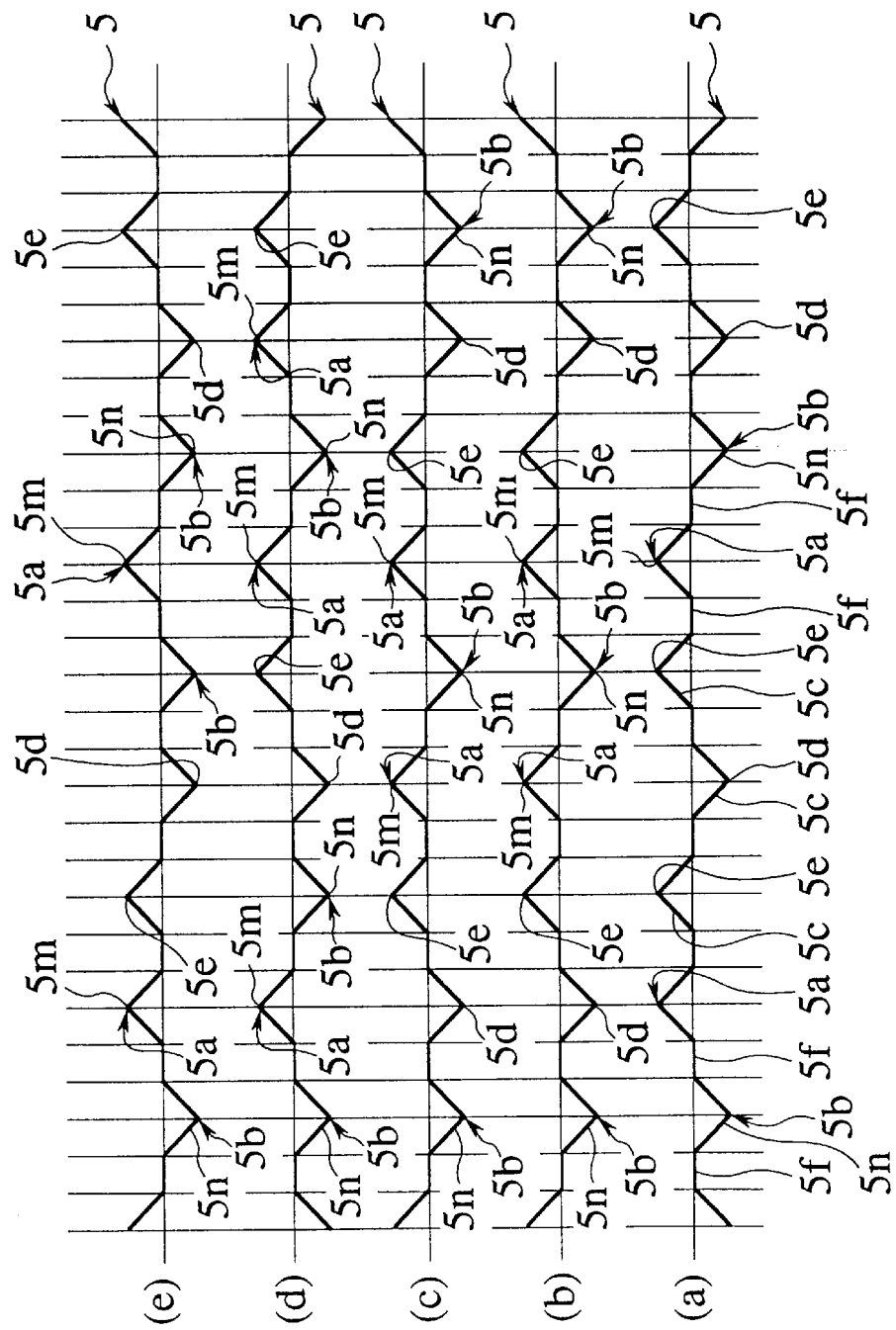
FIG. 7 is a sectional view showing the metal sheet in FIG. 6, wherein (a) to (e) show sectional shapes taken along VIIa—VIIa, VIIb—VIIb, VIIc—VIIc, VIId—VIId, and VIIe—VIIe lines in FIG. 6 respectively.
Figure 8:
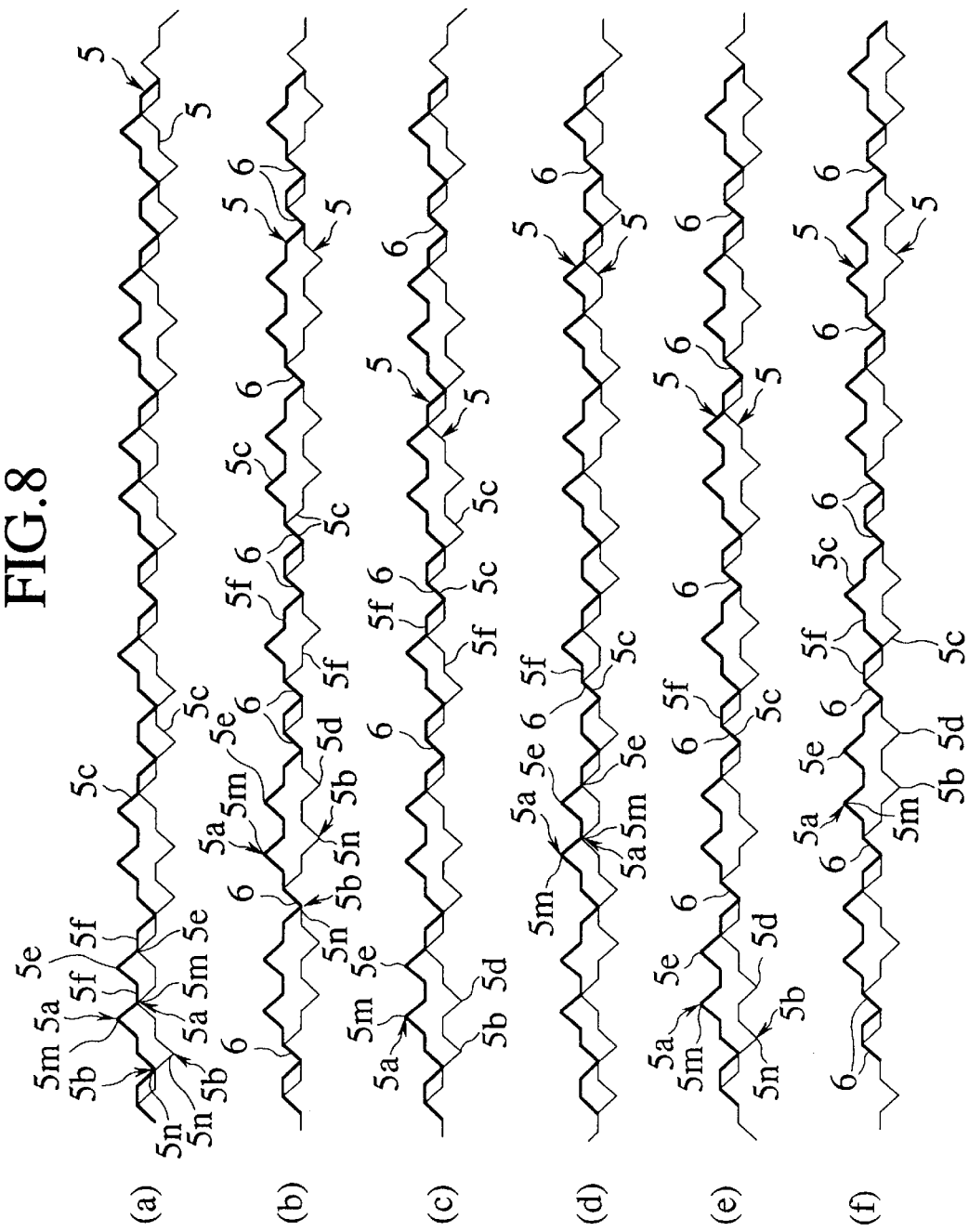
FIG. 8 is a sectional view showing cell states caused when two sheets of metal sheets in FIG. 6 are superposed, wherein (a) to (f) shows various states changed according to relative positions between two sheets of metal sheets respectively.

FIGS. 6 and 7 show a third embodiment of the metal sheet of the present invention.

FIG. 6 shows a standard pattern of the metal sheet 42 which is corrugated. A long metal sheet 42 can be constructed by repeating this unit metal sheet 42 along the corrugation direction 61

FIGS. 7(a) to (e) are sectional views showing the metal sheet 42 taken along VIIa—VIIa to VIIe—VIIe lines in FIG. 6 respectively.

The metal sheet 42 in this embodiment also has the crest portions 5a and the trough portions 5b as standard as shown in FIG. 2, and the rack portions 5f are formed along the folding direction 60 of the corrugate shape in the central area of the slant walls 5c constituting the crest portions 5a and the trough portions 5b.

The rising trough portions 5d which are formed in the opposite direction to the crest portions 5a of the corrugate shape with the use of the rack portions as the boundaries are formed in plural along the folding direction 60 of the corrugate shape, whereas the rising crest portions 5e which are formed in the opposite direction to the trough portions 5b of the corrugate shape are formed in plural along the folding direction 60 of the corrugate shape.

Then, as shown in FIG. 6, in this standard pattern, the rising trough portions 5d and the rising crest portions 5e are arranged such that at least part of some of the non-rising portions 5m of the crest portions 5a and the rising crest portions 5e and the non-rising portions 5n of the trough portions 5b and the rising trough portions 5d are aligned sequentially via the rack portions 5f along the corrugation direction 61.

In the embodiment, the contiguous number of the non-rising portions 5m of the crest portions 5a and the rising crest portions 5e and the non-rising portions 5n of the trough portions 5b and the rising trough portions 5d, which are adjacent along the corrugation direction 61, is set less than two.

The rising trough portions 5d and the rising crest portions 5e are formed such that their distances and their lengths are different in the folding direction 60 of the corrugate shape respectively.

FIGS. 8(a) to (f) show cell states caused when two sheets of standard patterns of this embodiment are superposed.

According to a structure of this embodiment, the rack portions 5f are formed as the boundaries in central areas of slant walls 5c, which constitute the crest portions 5a and the trough portions 5b of the corrugate shape, along the folding direction 60 of the corrugate shape, then the rising trough portions 5d are formed in plural along the folding direction 60 of the corrugate shape on the crest portion 5a of the corrugate shape, and then the rising crest portions 5e are formed in plural along the folding direction 60 of the corrugate shape on the trough portion 5b of the corrugate shape. Therefore, as shown in FIGS. 8(a) to (f), mutual fitting and sticking of the metal sheets 42, 42 can be avoided because of the presence of the rising trough portions 5d and the rising crest portions 5e even if the superposed metal sheets 42, 42 are displaced mutually in the folding direction 60 of the corrugate shape. In addition, since either the non-rising portions 5m of the crest portions 5a or the rising crest portions 5e, or the non-rising portions 5n of the trough portions 5b or the rising trough portions 5d abut to the rack portions 5f, mutual fitting and sticking of the metal sheets 42, 42 can be avoided even if the metal sheets 42, 42 are displaced mutually in the corrugation direction 61. Further, such abutting portions contribute to improve the rigidity of the honeycomb carrier 3a.

That is to say, when the metal sheets 42, 42 are superposed, the non-rising portions 5m of the crest portions 5a, the rising crest portions 5e, the non-rising portions 5n of the trough portions 5b, the rising trough portions 5d, and the rack portion 5f are brought into contact variously to thus form various shapes of the cells, as shown in FIGS. 8(a) to (f).

Especially, the rising trough portions 5d and the rising crest portions 5e are arranged such that at least part of some of the non-rising portions 5m of the crest portions 5a and the rising crest portions 5e and the non-rising portions 5n of the trough portions 5b and the rising trough portions 5d are aligned sequentially along the corrugation direction 61. In addition, all sectional shapes of the metal sheet 42, the contiguous number of the non-rising portions 5m of the crest portions 5a and the rising crest portions 5e and the non-rising portions 5n of the trough portions 5b and the rising trough portions 5d is set less than two. Therefore, even if slant wall sticking portions 6 in which the slant walls 5c, 5c are tightly contacted partially are caused because the metal sheets 42, 42 are displaced along the corrugation direction 61, as shown in FIGS. 8(a) to (f), for example, cells each having a relatively large aperture area can be formed, but a total cell area is not changed. Hence, if the metallic catalyst converter 1 is constructed by use of this metal sheet 42 like the above, the exhaust gas purifying performance can be improved and the slant wall sticking portions 6 can further enhance a strength of the honeycomb carrier 3a.

The rising trough portions 5d and the rising crest portions 5e which are adjacent to each other on the metal sheet 42 along the corrugation direction 61 are formed while using as the boundaries the rack portions 5f which are formed in the central area of the slant walls 5c constituting the crest portions 5a and the trough portions 5b of the corrugate shape of the metal sheet 42. For this reason, distances equivalent to the widths of the rack portions 5f can be assured along the corrugation direction 61 between respective rising stop ends E, E of the rising crest portions 5e and the rising trough portions 5d which are adjacent along the corrugation direction 61. Therefore, breaking between the rising stop ends E, E due to difference in coefficients of thermal expansion can be avoided. The abodes are similar to those in the first and second embodiments.

As a result, breaking endurance rigidity of the metal sheet 42 itself can be enhanced and thus durability of the honeycomb carrier 3a, i.e., durability of the metallic catalyst carrier 3 can be improved.

Figure 9:
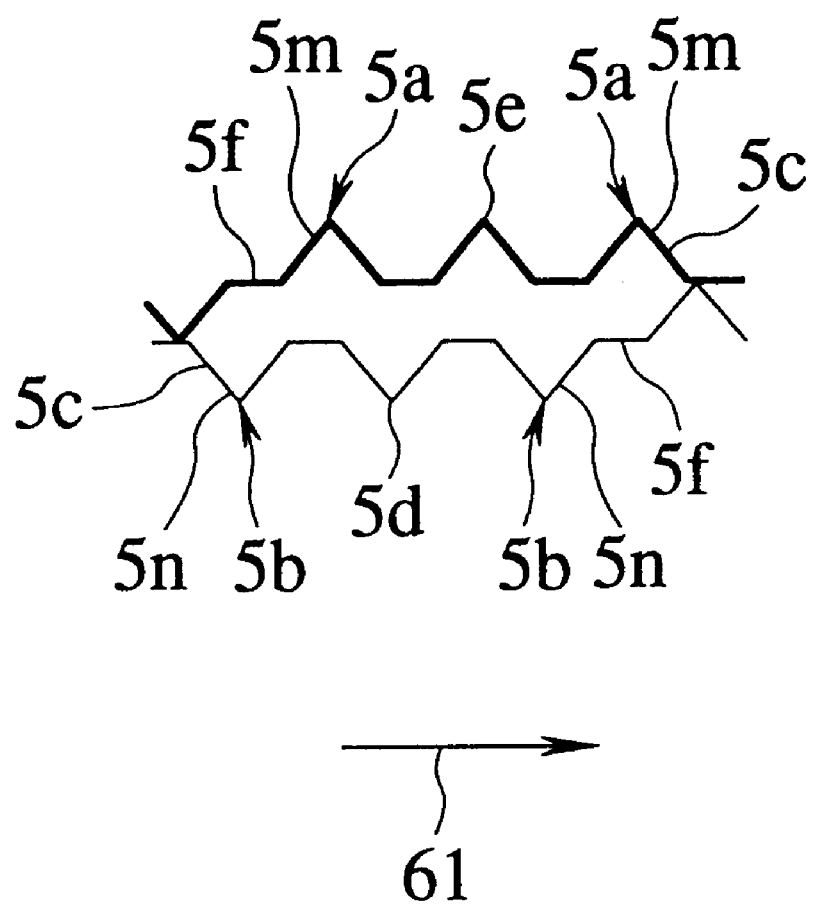
FIG. 9 is a sectional view showing cell states which are different from those in FIG. 8.

In the case of the metal sheet wherein the non-rising portions 5m of the crest portions 5a and the rising crest portions 5e and the non-rising portions 5n of the trough portions 5b and the rising trough portions 5d are formed in excess of three, for example, three of them respectively, sequentially and adjacently along the corrugation direction 61, the cells having large aperture area at a maximum can be formed between the non-rising portions 5m of the crest portions 5a and the rising crest portions 5e of one metal sheet and the non-rising portions 5n of the trough portions 5b and the rising trough portions 5d of the other metal sheet under the condition that superposed metal sheets are brought into contact with each other variously, as shown in FIG. 9.

Meanwhile, in this embodiment, the contiguous number of the non-rising portions 5m of the crest portions 5a and the rising crest portions 5e and the non-rising portions 5n of the trough portions 5b and the rising trough portions 5d is set less than two. Therefore, as described above, the maximum aperture area of the cells having the relatively large aperture area which is formed between the non-rising portions 5m of the crest portions 5a and the rising crest portions 5e of one metal sheet 42 and the non-rising portions 5n of the trough portions 5b and the rising trough portions 5d of the other metal sheet 42 becomes smaller than that of the cells shown in FIG. 9. Therefore, generation of extreme difference between respective cells can be suppressed and also the exhaust gas purifying performance can be maintained.

In addition, since the rising trough portions 5d and the rising crest portions 5e which are formed in plural along the folding direction 60 of the corrugate shape are formed to have their different distances and their different lengths along the folding direction 60 of the corrugate shape respectively, mutual fitting and sticking of the metal sheets 42, 42 can be firmly prevented.

Figure 10:
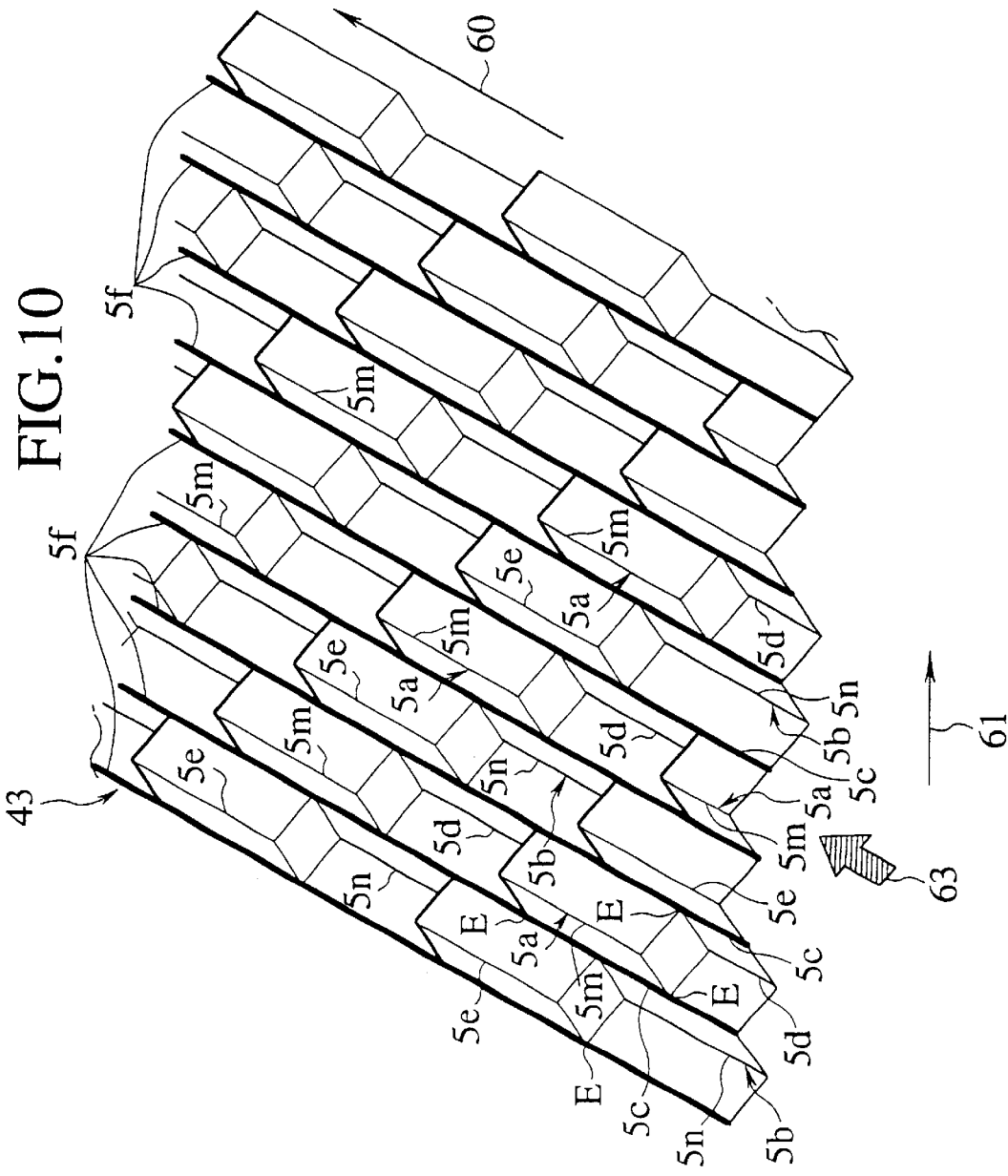
FIG. 10 is a perspective view showing a fourth embodiment of the metal sheet of the present invention.
Figure 11:
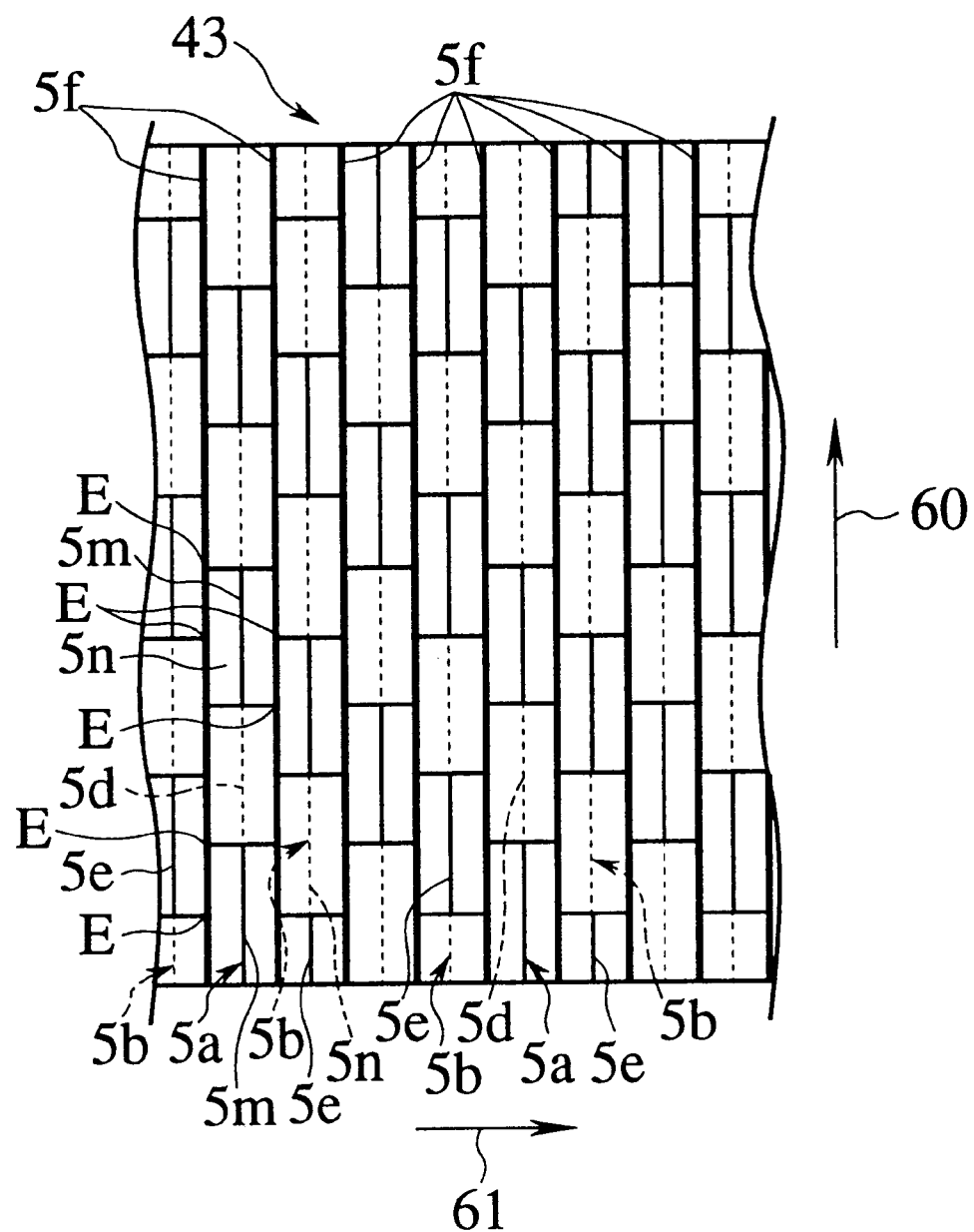
FIG. 11 is a plan view showing the metal sheet in FIG. 10.

FIGS. 10 and 11 show a fourth embodiment of the metal sheet of the present invention. FIG. 10 shows a perspective view and FIG. 11 shows a plan view.

In the fourth embodiment, regardless of the non-rising portions 5m of the crest portions 5a and the rising crest portions 5e and the non-rising portions 5n of the trough portions 5b and the rising trough portions 5d, crest shapes and trough shapes are constructed to have the same area respectively and are arranged based on a predetermined regularity.

As shown in FIG. 10, the trough portions 5b, the rack portions 5f, and the crest portions 5a are arranged on end surfaces of the metal sheet 43 such that, if viewed from a front side, the trough portion 5b—the rack portion 5f—the crest portion 5a—the trough portion 5b—the rack portion 5f—the crest portion 5a —... are arranged repeatedly along the corrugation direction 61. Both end portions along the corrugation direction 61 of the metal sheet 43 may be formed as any of the trough portions 5b, the rack portions 5f, and the crest portions 5a. Since the fourth embodiment differs from the first embodiment only in size and alignment of the crest portions and the trough portions, shapes of the rack portions 5f provided on the slant walls 5c are omitted from FIGS. 10 and 11.

In the trough portion 5b on the left side in FIG. 10, the rising crest portions 5e and the non-rising portions 5n are formed alternatively like the non-rising portion 5n—the rising crest portion 5e—the non-rising portion 5n . . . from the end surface along the folding direction 60. In the crest portion 5a adjacent to the trough portion 5b, the rising trough portions 5d and the non-rising portions 5m are formed alternatively like the rising trough portion 5d—the non-rising portion 5m—the rising trough portion 5d . . . from the end surface along the folding direction 60. In the end surface of the metal sheet 43, the trough portions and the crest portions are formed, if viewed from a front side, in the order of the non-rising portion 5n of the trough portion 5b—the rising trough portion 5d—the rising crest portions 5e—the non-rising portions 5m of the crest portion 5a . . . . along the corrugation direction 61. Besides, the non-rising portions 5m of the crest portions 5a and the rising crest portions 5e which are adjacent along the corrugation direction 61, or the non-rising portions 5n of the trough portions 5b and the rising trough portions 5d which are adjacent along the corrugation direction 61 are arranged based on such a regularity that they are arranged on a substantially straight line along the slant direction with respect to the folding direction 60 of the corrugate shape. The substantially straight line arrangement of the portions defines a diagonal line which intersects both the folding direction 60 and the corrugation direction 61). Moreover, a part of the non-rising portions 5m of the crest portions 5a and a part of the rising crest portions 5e , which are adjacent along the corrugation direction 61, are arranged such that they are aligned sequentially along the corrugation direction 61. In this case, inevitably a part of the non-rising portions 5n of the trough portions 5b and a part of the rising trough portions 5d , which are adjacent along the corrugation direction 61, are aligned sequentially along the corrugation direction 61.

In the above explanation, the descriptions to the effect that all the crest portions and the trough portions have the same area have been made. However, respective areas on both end portions of the folding direction 60 become different according to cutting position of the crest portions and the trough portions.

The metal sheets 5, 41, 42, 43 in the first to fourth embodiments which have been discussed in detail in the above are common in that the rack portions are provided, but different in formation patterns of the crest shapes and the trough shapes. The crest shapes and the trough shapes in the above first to fourth embodiments are mere exemplification and therefore such formation patterns are not limited to the above embodiments and various shapes and alignments can be utilized.

Figure 12:
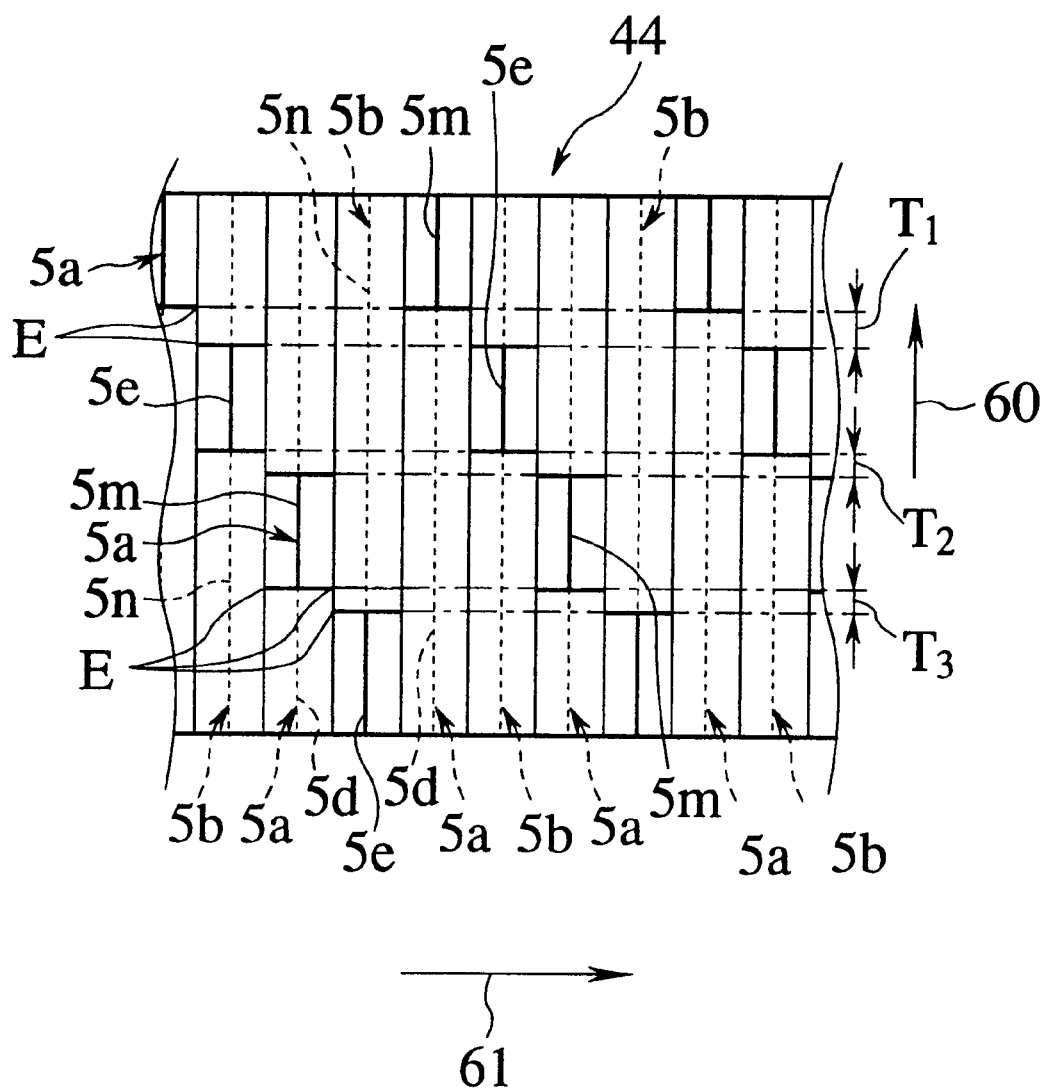
FIG. 12 is a plan view showing a fifth embodiment of the metal sheet of the present invention.
Figure 13:
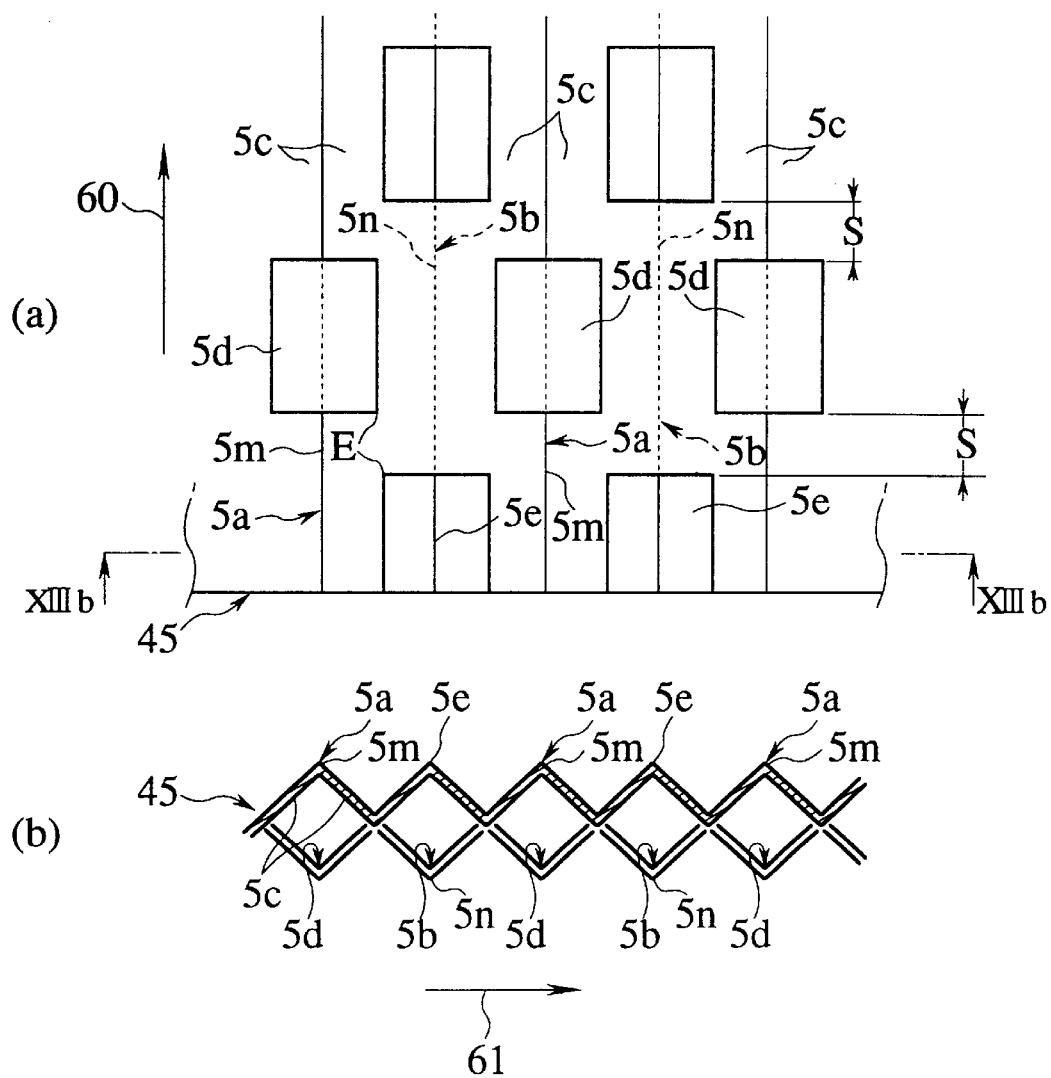
FIG. 13 is a view showing a sixth embodiment of the metal sheet of the present invention, wherein (a) is a plan view of the thinwalled sheet, and (b) is a sectional view of the thin-walled sheet taken along a XIIIb—XIIIb line.

FIG. 12 shows a fifth embodiment of the metal sheet of the present invention. FIG. 13 shows a sixth embodiment of the metal sheet of the present invention.

The fifth and sixth embodiments are different from the first to fourth embodiments in that the rack portions 5f extending along the folding direction 60 are not provided. In the fifth and sixth embodiments, portions which continue along the corrugation direction 61 while being folded are assured in place of the rack portions 5f in the first to fourth embodiments.

In the fifth embodiment shown in FIG. 12, the non-rising portions 5m of the crest portions 5a and the rising crest portions 5e, which are adjacent along the corrugation direction 61, are provided at distances T1, T2, T3 along the corrugation direction 61 on overall surface of the metal sheet 44.

In the sixth embodiment shown in FIG. 13, the metal sheet 45 the rising trough portions 5d and the rising crest portions 5e are formed at a predetermined distance S along the folding direction 60 of the corrugate shape in opposite directions from the central position of the slant walls 5c respectively. In other words, the rising trough portions 5d and the rising crest portions 5e are formed on the crest portions 5a and the trough portions 5b of the corrugate shape alternatively at a distance S along the folding direction 60 of the corrugate shape.

Accordingly, in the fifth and sixth embodiments, it is of course that the same exhaust gas purifying performance as those in the metal sheets 5, 41, 42, 43 in the first to fourth embodiments. In addition, since the predetermined distance S is provided between respective rising stop ends E, E of the rising trough portions 5d and the rising crest portions 5e along the folding direction 60 of the corrugate shape, breaking between the rising stop ends E, E due to difference in coefficients of thermal expansion and also the breaking endurance rigidity of the metal sheet 5 per se can be enhanced, like respective embodiments wherein the rack portions 5f are provided.

Figure 23:
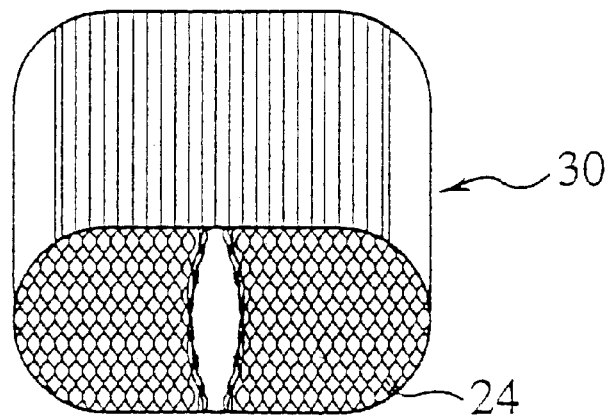
FIG. 23 is a perspective view showing an aperture opening state of the honeycomb carrier in FIG. 21.
Figure 24:
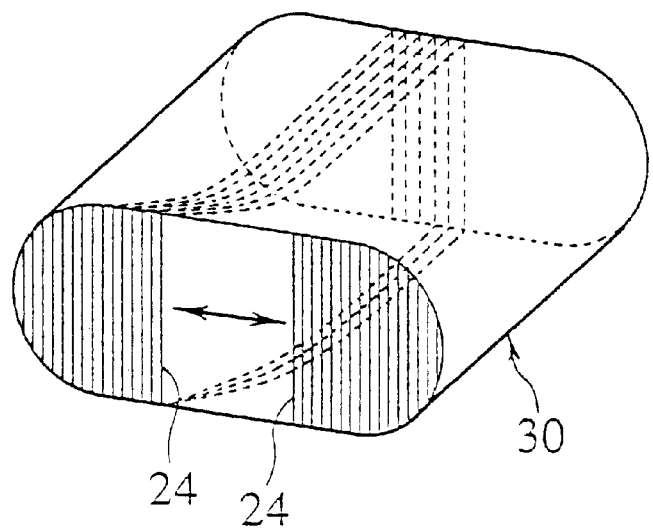
FIG. 24 is a perspective view showing an aperture opening state in a different example of the honeycomb carrier in the prior art.

In the meanwhile, even when the metallic catalyst converter 1 is constructed using any of the metal sheets 5, 41, 42, 43, since the metal sheets 5, 5 are not secured mutually in the honeycomb carrier 3a, as already shown in FIGS. 23 and 24, superposed metal sheets are opened by the exhaust gas pressure at least on the end surface on the exhaust gas input side, i.e., the so-called aperture opening phenomenon may be caused.

Figure 16:
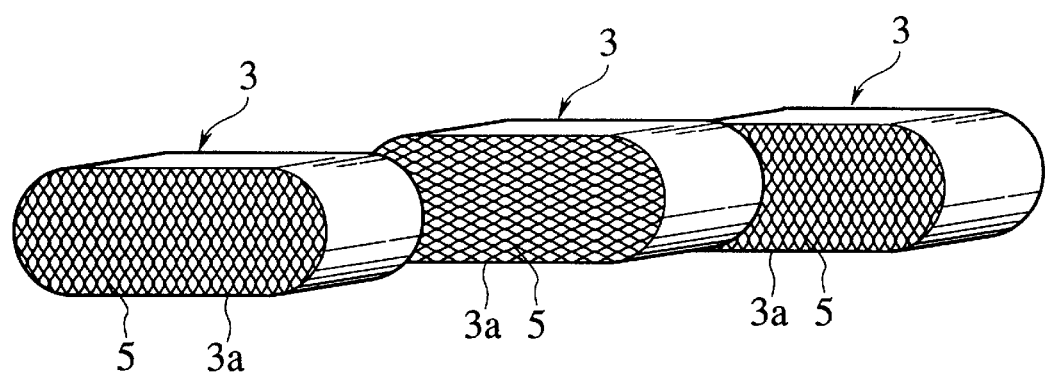
FIG. 16 is a perspective view showing catalyst carriers in a second embodiment of the metallic catalyst converter of the present invention.
Figure 17:
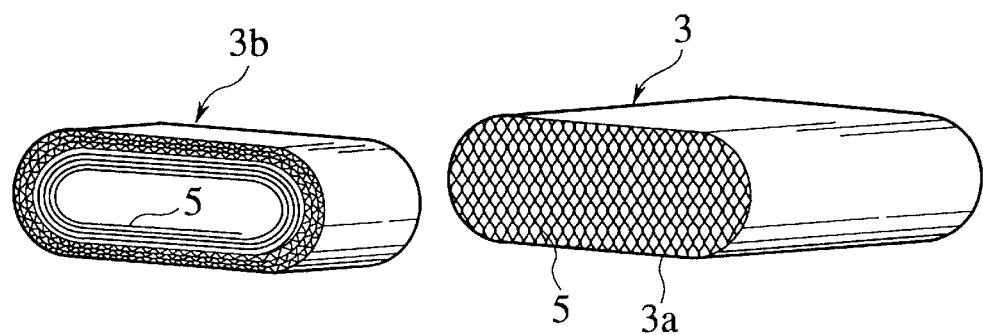
FIG. 17 is a perspective view showing catalyst carriers in a third embodiment of the metallic catalyst converter of the present invention.

Therefore, the aperture opening of the honeycomb carrier 3a can be prevented by providing the metallic catalyst converter 1 shown in FIGS. 16 and 17.

In FIGS. 16 and 17, for easy understanding of the structure, only the catalyst carrier is illustrated, and the honeycomb carrier 3a constituting the metallic catalyst carrier 3 is formed by folding up the corrugated metal sheets 5 like S-shape continuously along the corrugation direction 61 and then superposing them like a honeycomb shape, or cutting the metal sheets 5 at a predetermined length and then laminating plural sheets of the metal sheets 5 like a honeycomb shape. In FIGS. 15 to 17 and in the following explanation, the metal sheets 5 in the first embodiment has been illustrated, but the cases where the metal sheets 41, 42, 43, 44, 45 in other embodiments are employed are similar to the case where the metal sheets 5 are employed.

In the embodiment shown in FIG. 16, a plurality of metallic catalyst carriers 3 which use the above honeycomb carrier 3a as a base are arranged adjacently in the outer cylinder 2 in the backward/forward direction, and also the metallic catalyst carriers 3, 3 which are adjacent back and forth are arranged such that end portions are contacted by changing the superposing direction of the metal sheets 5 by 90° in phase.

Therefore, according to the structure of this embodiment, rigidity of the metal sheets 5 can be increased because respective widths of the metallic catalyst carriers 3, 3 in the backward/forward direction can be shortened and also opening of the superposed metal sheets 5, 5 of the metallic catalyst carriers 3, 3 because of the input exhaust gas pressure can be suppressed since edge portions of the metal sheets 5 of the metallic catalyst carriers 3, 3 are welded with pressure orthogonally at contacting portions of the metallic catalyst carriers 3, 3 which are adjacent back and forth, so that the aperture opening phenomenon of the metallic catalyst carriers 3a, 3a can be prevented.

In the embodiment shown in FIG. 17, a honeycomb regulating catalyst carrier 3b for regulating the input exhaust gas is arranged adjacently at least on the side end portion of the metallic catalyst carrier 3 which faces to the exhaust gas input side of the outer cylinder 2.

Figure 18:
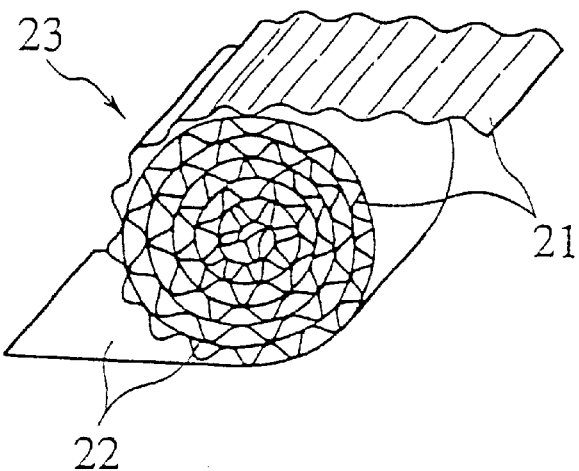
FIG. 18 is a schematic perspective view showing a metallic catalyst carrier manufacturing method in the prior art.
Figure 19:
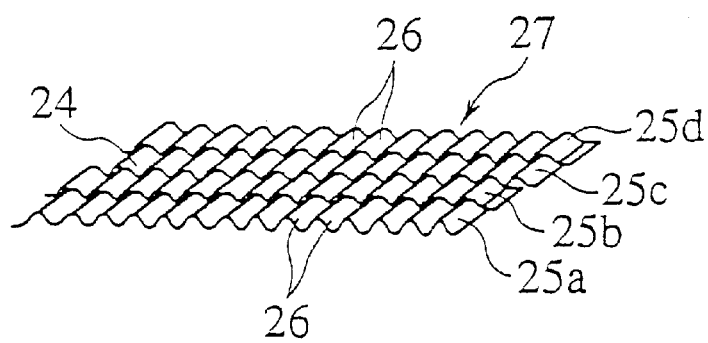
FIG. 19 is a perspective view showing a metal sheet in the prior art.
Figure 20:
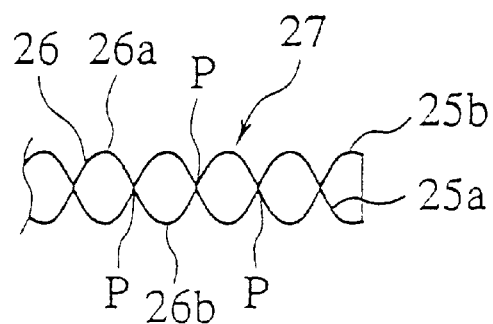
FIG. 20 is a front view showing the metal sheet shown in FIG. 19.
Figure 21:
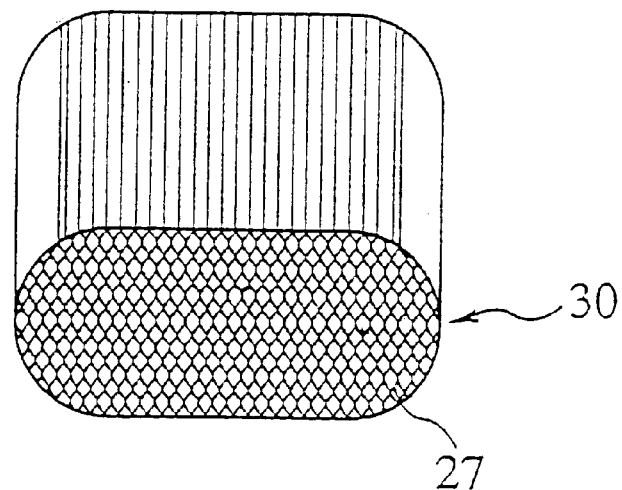
FIG. 21 is a perspective view showing a honeycomb carrier in the prior art.
Figure 22:
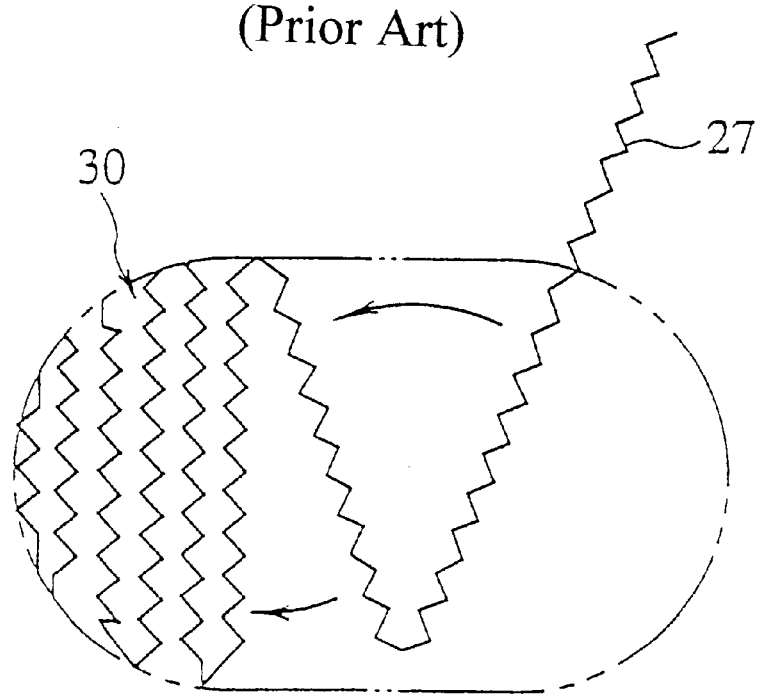
FIG. 22 is a schematic view showing honeycomb carrier forming processes in FIG. 21.

In this embodiment, as shown in FIG. 18, a honeycomb carrier 3b which is formed by winding a single corrugated sheet and a single flat sheet made of the metal sheet bases and then securing them mutually is employed as the regulating catalyst carrier 3b. In addition, a carrier which is formed by winding the corrugated metal sheet 5 like a spiral shape to laminate while forming the cells between laminated layers may be employed.

Further, the regulating catalyst carrier 3b may be formed by integral molding type ceramics.

Since the regulating catalyst carrier 3b per se which is constructed using the honeycomb carrier being formed by winding the above corrugated sheet and the flat sheet and adhering them is extremely large in strength, the aperture opening is not caused at all even if the exhaust gas entering into the outer cylinder 2 is concentrated to the neighborhood of the center of the regulating catalyst carrier 3b.

Furthermore, as the above regulating catalyst carrier 3b, such a carrier may be employed that the corrugated metal sheets 5 is wound like a spiral shape to form the honeycomb carrier. In this case, even though the exhaust gas entering into the outer cylinder 2 is concentrated around the center of the regulating catalyst carrier 3b, the metal sheets can be difficult to be opened since the metal sheet 5 is wounded and laminated other than S-shaped folded laminating body or overlapping laminating layer body, and the input exhaust gas can be scattered substantially uniformly in the radial direction (see FIG. 3) and thus concentration of the exhaust gas to the center portion of the outer cylinder 2 can be avoided since the corrugated crest portions 5a, the trough portions 5b and the rising trough portions 5d, the rising crest portions 5e are combined complicatedly in the metal sheet 5. As a consequence, the metal sheets 5 in the metal catalyst carrier 3 provided in the downstream, because of the input exhaust gas pressure, can be suppressed and thus the aperture opening phenomenon of the honeycomb 3a can be prevented. In addition, unlike the case where only the regulating catalyst carrier 3b which is formed by winding the metal sheet 5 spiral to be laminated is employed alone, the film-out phenomenon in which the metal sheets 5 are protruded backward in a spiral manner at the central area by the input exhaust gas pressure is unlikely occurs. Hence, the exhaust gas purifying performance can be improved still further.

In the above embodiments, the crest portions 5a, the trough portions 5b, the rising trough portions 5d, and the rising crest portions 5e are formed to have substantially triangular sectional shapes. But the present invention is not limited to such sectional shapes.

INDUSTRIAL APPLICABILITY

As described above, according to the metal sheet of the present invention, when the honeycomb carrier in which a number of cells are formed by superposing the metal sheets is constructed, mutual fitting and sticking of the metal sheets can be avoided even if the metal sheets are displaced mutually along the folding direction of the corrugate shape. In addition, even if the metal sheets are shifted in the corrugation direction, mutual fitting and sticking of the metal sheets can be avoided since the first concave portion or the second concave portion, or the third concave portion or the fourth concave portion hits on the rack portions. Cells can be assured as a whole and thus exhaust gas purifying performance can be maintained. Accordingly, the metal sheet is suitable for the metallic catalyst carrier for use in the metallic catalyst converter.

What is claimed is:

1. metallic catalyst carrier comprising:
    first and second metalic sheet parts superposed on each other and in contact with each other at respective portions thereof,
    each sheet part comprising:
    a plurality of first convex portions;
    a plurality of second convex portions; and
    a plurality of rack portions; wherein
    the first convex portions are folded to protrude to one surface side of the sheet part and extended in a first direction,
    the second convex portions are folded to protrude to another surface side of the sheet part and extended in the first direction,
        the first convex portions and the second convex portions are arranged alternatively in parallel along a second direction intersecting with the first direction to form a corrugate shape,
        the rack portions are arranged between the first convex portions and the second convex portions, and extend along the first direction, and connect adjacent first convex portions and second convex portions,
        the first convex portions have third convex portions which are divided by two cuttings separated in the first direction and are folded to protrude partially to the other surface side of the sheet part, and
        the second convex portions have fourth convex portions which are divided by two cuttings separated in the first direction and are folded to protrude partially to the one surface side of the sheet part,
        wherein the third convex portions of the first sheet part are to be brought in contact with the rack portions of the second sheet part, and fourth convex portions of the second sheet part are to brought in contact with the rack portions of the first sheet part.

2. The metallic catalyst carrier set fourth in claim 1, wherein
    end portions of the cuttings for dividing the third convex portions are positioned on boundary portions between the first convex portions and the rack portions,
    the third convex portions are formed from the boundary portions between the first convex portions and the rack portions,
    end portions of the cuttings for dividing the fourth convex portions are positioned on boundary portions between the second convex portions and the rack portions, and
    the fourth convex portions are folded from the boundary portions between the second convex portions and the rack portions.

3. The metal sheet arrangement for the metallic catalyst carrier set forth in claim 1, wherein
    the third convex portions and the fourth convex portions of each sheet part are provided respectively along the first direction in plural.

4. The metallic catalyst carrier set forth in claim 3, wherein
    the third convex portions and the fourth convex portions are arranged based on predetermined regularity.

5. The metallic catalyst carrier set forth in claim 4, wherein
    the first convex portions and the fourth convex portions are arranged adjacent to each other relative to the first direction.

6. The metallic catalyst carrier set forth in claim 4, wherein
    the second convex portions and the third convex portions are arranged adjacent to each other relative to the first direction.

7. The metallic catalyst carrier set forth in claim 5, wherein
    the third convex portions and the fourth convex portions are arranged adjacent to each other relative to the first direction.

8. The metallic catalyst carrier set forth in claim 3, wherein
    the first convex portions and the fourth convex portions are arranged adjacent to each other relative to the first direction and
    the second convex portions and the third convex portions are arranged adjacent to each other relative to the first direction.

9. The metallic catalyst carrier set forth in claim 8, wherein
    at least one of lengths of the third convex portions provided in the same first convex portions along the first direction is different from the other lengths thereof,
    at least one of lengths of clearances formed between the third convex portions provided in the same first convex portions along the first direction is different from other lengths thereof,
    at least one of lengths of the fourth convex portions provided in the same second convex portions along the first direction is different from other lengths thereof, and
    at least one of lengths of clearances formed between the fourth convex portions provided in the same second convex portions along the first direction is different from other lengths thereof.

10. The metallic catalyst carrier set forth in claim 8, wherein
    both a number of the contiguous first convex portions and fourth convex portions to protrude to the one surface side of the sheet part and a number of the contiguous second convex portions and third convex portions to protrude to the other surface side of the sheet part are less than two.

11. A honeycomb carrier the metal catalyst carrier set forth in claim 1,
    wherein the sheet part is continuously folded in an S-shape or the sheet part is cut to be superposed.

12. A metallic catalyst converter comprising: the honeycomb carrier set forth in claim 11;
    a metal outer cylinder into which the metallic catalyst carrier is incorporated; and
    a holding member for holding the metallic catalyst carrier. metallic catalyst carrier set forth in claim 1, wherein end portions of the cuttings for dividing the third convex portions are positioned on boundary portions between the first convex portions and the rack portions, the third convex portions are folded from the boundary portions between the first convex portions and the rack portions, end portions of the cuttings for dividing the fourth convex portions are positioned on boundary portions between the second convex portions and the rack portions, and the fourth convex portions are folded from the boundary portions between the second convex portions and the rack portions.

13. The metallic catalyst converter set forth in claim 12, wherein the metallic catalyst carrier comprises a plurality of metallic catalyst carriers, each having an outer tubular member the outer tubular members are arranged in alignment with and adjacent to each other and end surfaces of the metallic catalyst carriers placed adjacently in the direction contact with each other such that superposed directions of sheet parts constituting the metallic catalyst carrier are substantially normal to each other.

14. The metallic catalyst converter set forth in claim 12, further comprising regulating catalyst carriers positioned at least adjacent to side end portion of the metallic catalyst carrier facing to an exhaust inlet side of the outer cylinder, and for regulating an incoming exhaust gas.

15. The metallic catalyst carrier set forth in claim 6, wherein the third convex portions provided in the first convex portions and the fourth convex portions provided in the second convex portions adjacent to the first convex portions are arranged such that at least parts thereof in the first direction continue along the second direction.

16. The metallic catalyst carrier set forth in claim 9, wherein both a number of the contiguous first convex portions and fourth convex portions to protrude to the one surface side of the sheet part and a number of the contiguous second convex portions and third convex portions to protrude to the other surface side of the sheet part are less than two.

17. A metallic catalyst carrier comprising:

first and second metallic sheet parts superposed on each other and in contact with each other at respective portions thereof, each sheet part comprising:
 a plurality of first convex portions; and
 a plurality of second convex portions; wherein
  the first convex portions are folded to protrude to one surface side of the sheet part and extended in a first direction,
  the second convex portions are folded to protrude to another surface side of the sheet part and extended in the first direction,
  the first convex portions and the second convex portions are arranged alternatively along a second direction intersecting with the first direction to form a corrugate shape, the first convex portions have third convex portions which are divided by two cuttings separated along the first direction and are folded to protrude partially to the other surface side of the sheet part, the second convex portions have fourth convex portions which are divided by two cuttings separated along the first direction and are folded to protrude partially to the one surface side of the sheet part, the third convex portions and the fourth convex portions are provided in plural along the first direction respectively, and wherein the third convex portions of the first sheet part are to be brought in contact with the first convex portions of the second sheet part, and fourth convex portions of the second sheet part are to brought in contact with the second convex portions of the first sheet part.

18. A metallic catalyst carrier comprising:

first and second metallic sheet parts superposed on each other and in contact with each other at respective portions thereof, each sheet part comprising:
 a plurality of first convex portions; and
 a plurality of second convex portions; wherein
  the first convex portions are folded to protrude to one surface side of the sheet part and extended in a first direction,
  the second convex portions are folded to protrude to another surface side of the sheet part and extended in the first direction,
  the first convex portions and the second convex portions are arranged alternatively along a second direction intersecting with the first direction to form a corrugate shape,
  the first convex portions have third convex portions which are divided by two cuttings separated along the first direction and are folded to protrude partially to the other surface side of the sheet part,
  the second convex portions are divided by two cuttings separated along the first direction, and have fourth convex portions which are folded to protrude partially to the one surface side of the sheet part,
  the third convex portions and the fourth convex portions are provided in plural along the first direction respectively, and
  predetermined intervals are provided between end portions of the cuttings for dividing the third convex portions and end portions of the cuttings for dividing the fourth convex portions along the first direction, wherein the third convex portions of the first sheet part are to be brought in contact with the first convex portions of the second sheet part, and fourth convex portions of the second sheet part are to brought in contact with the second convex portions of the first sheet part.

* * * * *

UNITED STATES PATENT AND TRADEMARK OFFICE
CERTIFICATE OF CORRECTION

PATENT NO. : 6,287,523 B1
DATED : September 11, 2001
INVENTOR(S) : Hirohashi et al.

It is certified that error appears in the above-identified patent and that said Letters Patent is hereby corrected as shown below:

Claim 1,
Line 1, insert -- a -- before "metallic"

Claim 2,
Line 6, change "formed" to -- folded --

Claim 3,
Line 1, delete "metal sheet arrangement for the"

Claim 8,
Line 5, insert -- , -- after "direction"

Claim 11,
Line 1, after "carrier" insert -- comprising --
Line 1, change "metal" to -- metallic --

Claim 12,
Delete lines 6-18

Claim 13,
Line 4, after "member" insert -- , --
Line 6, after "other" insert -- , --
Line 8, delete "in the direction".

Signed and Sealed this

Twelfth Day of March, 2002

*Attest:*

*Attesting Officer*

JAMES E. ROGAN
*Director of the United States Patent and Trademark Office*